United States Patent
Eguchi et al.

(10) Patent No.: US 7,274,476 B2
(45) Date of Patent: Sep. 25, 2007

(54) FACSIMILE APPARATUS HAVING A FUNCTION OF ARCHIVING AN IMAGE DATA INTO AN EXTERNAL DEVICE THROUGH A NETWORK

(75) Inventors: Masashi Eguchi, Joyo (JP); Yoshifumi Tanimoto, Hirakata (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 1085 days.

(21) Appl. No.: 10/324,819

(22) Filed: Dec. 20, 2002

(65) Prior Publication Data

US 2003/0117665 A1    Jun. 26, 2003

(30) Foreign Application Priority Data

| Dec. 20, 2001 | (JP) | ............................. 2001-387779 |
| Dec. 20, 2001 | (JP) | ............................. 2001-387820 |
| Dec. 26, 2001 | (JP) | ............................. 2001-393092 |

(51) Int. Cl.
  *G06K 1/00* (2006.01)
  *H04N 1/00* (2006.01)
  *G06F 15/16* (2006.01)

(52) U.S. Cl. ..................... 358/1.15; 358/400; 358/405; 709/205

(58) Field of Classification Search ............... 358/1.15, 358/400, 405; 709/205, 206
See application file for complete search history.

(56) References Cited

U.S. PATENT DOCUMENTS 5,325,310 A * 6/1994 Johnson et al. ............. 709/206

FOREIGN PATENT DOCUMENTS

| JP | 07-058897 |   | 3/1995 |
| JP | 08-037576 |   | 2/1996 |
| JP | 08-107486 |   | 4/1996 |
| JP | 09-284332 |   | 10/1997 |
| JP | 100985573 | * | 4/1998 |
| JP | 10/293733 |   | 11/1998 |
| JP | 10/307771 |   | 11/1998 |
| JP | 2001-053924 |   | 2/2001 |
| JP | 2001-103232 |   | 4/2001 |
| JP | 2001-169069 |   | 6/2001 |
| JP | 2001-313776 |   | 11/2001 |

* cited by examiner

*Primary Examiner*—Jerome Grant
*Assistant Examiner*—Houshang Safaipour
(74) *Attorney, Agent, or Firm*—Hogan & Hartson LLP

(57) ABSTRACT

A facsimile apparatus includes an e-mail creation unit that creates an email including image data transmitted or received by facsimile or via an Internet, and a setting information specification unit that specifies archive setting information based on a communication type when transmitting or receiving image data. An archive unit archives the created e-mail after transmitting to a predetermined e-mail address for archiving based on the specified archive setting information.

7 Claims, 24 Drawing Sheets

FIG.3A

| | COMMUNICATION TYPE | NEED FOR ARCHIVE | ARCHIVE DESTINATION | FILE FORMAT | FILE NAME | MESSAGE DESCRIPTION |
|---|---|---|---|---|---|---|
| T1 | FAX TRANSMISSION | YES | FAX@aaa.com | TIFF | FAX-T | FAX TRANSMISSION |
| T2 | FAX RECEPTION | YES | FAX@aaa.com | TIFF | FAX-R | FAX RECEPTION |
| T3 | I-FAX TRANSMISSION | YES | FAX@aaa.com | TIFF | IFAX-T | I-FAX TRANSMISSION |
| T4 | I-FAX RECEPTION | YES | FAX@bbb.com | TIFF | IFAX-R | I-FAX RECEPTION |

FIG.3B

| | COMMUNICATION TYPE | NEED FOR ARCHIVE | ARCHIVE DESTINATION | FILE FORMAT | FILE NAME | MESSAGE DESCRIPTION |
|---|---|---|---|---|---|---|
| T5 | FAX Transmission secure | NO | FAX@aaa.com | TIFF | FAX-Tsecure | FAX TRANSMISSION |
| T6 | batch | YES | FAX@aaa.com | JPEG | FAX-Tbatch | FAX RECEPTION |
| T7 | polling | YES | FAX@aaa.com | JPEG | FAX-Tpo | I-FAX TRANSMISSION |
| T8 | error | YES | FAX@aaa.com | JPEG | FAX-Terror | I-FAX RECEPTION |

FIG.3C

| | COMMUNICATION TYPE | NEED FOR ARCHIVE | ARCHIVE DESTINATION | FILE FORMAT | FILE NAME | MESSAGE DESCRIPTION |
|---|---|---|---|---|---|---|
| T9 | FAX Transmission secure | NO | FAX@aaa.com | TIFF | FAX-Rsecure | FAX TRANSMISSION |
| T10 | F code | YES | FAX@aaa.com | TIFF | FAX-RFcode | FAX RECEPTION |
| T11 | polling | YES | FAX@aaa.com | TIFF | FAX-Rpo | I-FAX TRANSMISSION |
| T12 | error | YES | FAX@aaa.com | TIFF | FAX-Rerror | I-FAX RECEPTION |

| COMMUNICATION TYPE | Need for Archive | Archive Destination | File Format | FILE NAME | Account | Message Description |
|---|---|---|---|---|---|---|
| T13 — I-FAX Transmission account1 | YES | FAX@aaa.com | JPEG | FAX-Taccount | abc | FAX Transmission |
| T14 — account2 | NO | FAX@aaa.com | TIFF | FAX-Taccount | zzz | FAX Reception |
| T15 — error | YES | FAX@aaa.com | TIFF | FAX-Terror | | I-FAX Transmission |
| T16 — remote | NO | FAX@aaa.com | TIFF | FAX-Tremote | | I-FAX Reception |

| COMMUNICATION TYPE | Need for Archive | Archive Destination | File Format | FILE NAME | Account | Message Description |
|---|---|---|---|---|---|---|
| T17 — I-FAX Reception account1 | NO | FAX2@bbb.com | JPEG | FAX-Taccount | bbb | FAX Transmission |
| T18 — account2 | YES | FAX2@bbb.com | TIFF | FAX-Taccount | xxx | FAX Reception |
| T19 — error | YES | FAX2@bbb.com | TIFF | FAX-Terror | | I-FAX Transmission |
| T20 — receipt confirmation | NO | FAX2@bbb.com | TIFF | FAX-Treceipt | | I-FAX Reception |
| T21 — remote | NO | FAX2@bbb.com | TIFF | FAX-Tremote | | |

FIG.4A

Archive Management Record (Transmission) 22

| Communication Time | Destination | Number of Page | Document Size | Resolution | Communication Result | Archive Destination | File Name | File Format | Message |
|---|---|---|---|---|---|---|---|---|---|
| 2001/09/01 09:30:45 | 075-1234-5678 | 1 | A4 | Fine | OK | FAX@aaa.com | FAX-T001 | TIFF | TIFF |
| 2001/09/02 10:15:20 | abc@def.com | 2 | A4 | Standard | OK | FAX@aaa.com | FAX-T002 | TIFF | TIFF |
| 2001/09/03 11:25:30 | ***@aaa.com | 5 | A3 | Super Fine | Error | FAX@aaa.com | FAX-T003 | JPEG | JPEG |
| | | | | | | | | | |

FIG.4B

Archive Management Record (Reception) 22

| Communication Time | Destination | Number of Page | Document Size | Resolution | Communication Result | Archive Destination | File Name | File Format | Message |
|---|---|---|---|---|---|---|---|---|---|
| 2001/09/01 09:14:40 | 075-0000-1111 | 3 | A4 | Fine | OK | FAX@aaa.com | FAX-R001 | TIFF | TIFF |
| 2001/09/03 12:15:02 | ***@000.com | 1 | A4 | Standard | OK | FAX@aaa.com | IFAX-R002 | TIFF | TIFF |
| 2001/09/04 02:15:14 | 00@***.com | 1 | A3 | Standard | OK | FAX2@bbb.com | IFAX-R003 | JPEG | JPEG |
| | | | | | | | | | |

| CONDITION | NEED FOR CREATING MAIL WITHOUT ATTACHING E-MAIL | KEYWORD |
|---|---|---|
| to=075-1234-5678 | YES | KYOTO BRANCH |
| to=aaa@***.com | YES | OSAKA BRANCH |
| subject=circulate | NO | INTERNAL CIRCULATION |
| sub address=333 | NO | FOR INTERNAL USE ONLY |

| CONDITION | NEED FOR CREATING MAIL WITHOUT ATTACHING E-MAIL | KEYWORD |
|---|---|---|
| TSI=075-1234-5678 | YES | KYOTO BRANCH |
| from=aaa@***.com | NO | OSAKA BRANCH |
| subject=circulate | YES | INTERNAL CIRCULATION |
| sub address=333 | NO | FOR INTERNAL USE ONLY |

FIG.11A

Archive Management Record (Transmission) 122

| Communication Time | Destination | Number of Page | Document Size | Resolution | Communication Result | Archive Destination | Keyword |
|---|---|---|---|---|---|---|---|
| 2001/09/01 09:30:45 | 075-1234-5678 | 1 | A4 | Fine | OK | FAX@aaa.com | KYOTO BRANCH |
| 2001/09/02 10:15:20 | abc@def.com | 2 | A4 | Standard | OK | FAX@aaa.com | |
| 2001/09/03 11:25:30 | ***@aaa.com | 5 | A3 | Super Fine | Error | FAX@aaa.com | OSAKA BRANCH |
| | | | | | | | |

FIG.11B

Archive Management Record (Reception) 122

| Communication Time | Destination | Number of Page | Document Size | Resolution | Communication Result | Archive Destination | Keyword |
|---|---|---|---|---|---|---|---|
| 2001/09/01 09:14:40 | 075-0000-1111 | 3 | A4 | Fine | OK | FAX@aaa.com | |
| 2001/09/03 12:15:02 | ***@000.com | 1 | A4 | Standard | OK | FAX@aaa.com | |
| 2001/09/04 02:15:14 | 00@***.com | 1 | A3 | Standard | OK | FAX2@bbb.com | OSAKA BRANCH |
| | | | | | | | |

FIG.17

Archive Management Record (221)

| Communication Time | Destination | Number of Page | Document Size | Resolution | Communication Result | Archive Destination |
|---|---|---|---|---|---|---|
| 2001/09/01 21:30:45 | 075-1234-5678 | 1 | A4 | Fine | OK | FAX@aaa.com |
| 2001/09/01 21:31:45 | 075-0000-1111 | 2 | A4 | Standard | OK | FAX@aaa.com |
| 2001/09/01 21:32:45 | 075-1111-2222 | 5 | A3 | Super Fine | Error | FAX@aaa.com |
| 2001/09/01 21:35:45 | 075-2222-3333 | 5 | A3 | Super Fine | OK | FAX@aaa.com |
| 2001/09/02 09:30:45 | 075-3333-5678 | 1 | A4 | Fine | OK | FAX@aaa.com |
| 2001/09/02 09:32:00 | 075-2222-1111 | 2 | A4 | Standard | OK | FAX@aaa.com |
| 2001/09/02 09:36:23 | 075-1111-9999 | 5 | A3 | Super Fine | Error | |

CHOOSE ARCHIVE METHOD
IN CASE THAT AN ERROR OCCURS
WHILE BROADCASTING TRANSMISSION (1) ARCHIVE AFTER TRANSMITTING TO THE ENTIRE
    BROADCASTING DESTINATIONS (2) ARCHIVE AFTER TRANSMITTING TO AT LEAST
    ONE DESTINATION (3) ALWAYS ARCHIVE

FACSIMILE APPARATUS HAVING A FUNCTION OF ARCHIVING AN IMAGE DATA INTO AN EXTERNAL DEVICE THROUGH A NETWORK

BACKGROUND OF THE INVENTION

1. Field of the Invention

The present invention relates to a facsimile apparatus that has a function of selecting transmitted or received image data and saving the selected transmitted or received image data into an external device through a network.

2. Description of the Related Art

A typical facsimile apparatus has a facsimile communication function, which transmits or receives image data via an Internet (hereafter called "Internet facsimile"). A facsimile apparatus is also proposed for saving image data in an external device, the data of which is transmitted or received via a facsimile communication and an Internet. The apparatus is connected to a terminal device for archiving (archive terminal device) capable of receiving an e-mail through a network, and has a function of saving transmitted and received image data in the archive terminal device by attaching the image data in the e-mail and transmitting it to the archive terminal device. As the apparatus can save transmitted or received image data in an external device, the image data does not influence memory capacity of own device (facsimile apparatus itself), and can be saved safely. The conventional facsimile apparatus has the following disadvantages.

A first disadvantage of the conventional facsimile apparatus is that the archive terminal device cannot be easily operated or managed. For example, the contents of the saved image data or a file format cannot be checked until opening the saved e-mail, as the entire transmitted or received image data is saved in the archive terminal device. Moreover, all of the transmitted or received image data is saved, so that memory resources of the archive terminal device is wasted, unnecessary image data is increased and it takes a lot of trouble to operate and manage the archive terminal device.

A second disadvantage of the conventional facsimile apparatus is that unauthorized third parties can access the archive terminal device, and display or print image data, even if the image data is transmitted using a secured transmission function.

A third disadvantage of the conventional facsimile apparatus is that transmission image data is respectively saved in an archive terminal device with the e-mail every time transmitting documents, as well as normal transmission image data, even in the case of broadcasting and batch transmission functions. The broadcasting transmission function is used for transmitting the same transmission image data to a plurality of destinations in one operation for saving data in the archive terminal device. The batch transmission function is used for transmitting multiple image data of documents that is accumulated for transmitting to one destination. As image data transmitted using the broadcasting function is saved in a plurality of e-mail files, the data wastes memory resources of the archive terminal device. Additionally, as it is difficult to identify at a glance that a document is transmitted using the broadcasting function, the archive terminal device cannot be easily operated or managed. Moreover, even in the case of batch transmission, the archive terminal device cannot be easily operated or managed, as the data including some documents transmitted to the same destination all at once is saved in a plurality of e-mails.

SUMMARY OF THE INVENTION

A first advantage of the present invention is to provide a facsimile apparatus, whose efficiency is improved in operating and managing image data saved in the archive terminal device. The facsimile apparatus has a function of archiving transmitted or received image data by transmitting the data to a predetermined e-mail address for archiving.

A second advantage of the present invention is to provide a facsimile apparatus that can prevent unauthorized third parties from accessing the image data transmitted or received using a secured function. The facsimile apparatus has a function of archiving transmitted or received image data.

A third advantage of the present invention is to provide a facsimile apparatus, in which image data of an archived document can be easily operated or managed by transmitting the data using the broadcasting and batch functions. The facsimile apparatus has a function for archiving transmitted or received image data.

A first aspect of the present invention is that a facsimile apparatus includes an e-mail creation unit that creates an e-mail including image data transmitted or received by facsimile or via an Internet, a setting information specification unit that specifies archive setting information based on a communication type when transmitting or receiving image data, and an archive unit that archives the created e-mail after transmitting to a predetermined e-mail address for archiving based on specified archive setting information. The facsimile apparatus can archive data based on operators' instruction, and the archived image data can be easily operated or managed.

Moreover, the archive setting information includes one or all parts of an e-mail address for archiving, a need for archive, a format of image data to be archived, and a file name of image data to be archived. The facsimile apparatus is capable of saving only transmitted or received image data that is really needed based on operators' instructions, and prevents from wasting memory resources in the archive terminal apparatus, so that the archived image data can be easily operated or managed. Furthermore, the archived image data can be easily operated or managed by providing an archive terminal device in every transmitted or received image data and archiving the data to a given destination, or by specifying a format or file name of transmitted or received image data to be archived.

A second aspect of the present invention is that a facsimile apparatus includes an e-mail creation unit that creates an e-mail including image data transmitted or received by facsimile or via an Internet, a message description unit that describes a message in a predetermined place in an e-mail to be archived, a message specification unit that specifies a content of a message based on a communication type of transmitted or received image data, an archive unit that transmits an e-mail to be archived to an e-mail address for archiving based on a specification of the message specification unit. Thus, the efficiency in operating and managing data is improved as a communication type of the image data can be easily identified when seeing a message described in a predetermined part of an e-mail attaching transmitted or received image data that is archived in an archive terminal device.

Moreover, the communication types include facsimile transmission, facsimile reception, Internet facsimile transmission, or Internet facsimile reception, so that image data to be archived can be managed based on a communication type.

A third aspect of the present invention is that a facsimile apparatus includes an e-mail creation unit that creates e-mail attached image data transmitted or received by facsimile or via an Internet, an archive unit that transmits an e-mail created in the e-mail creation unit to a predetermined e-mail address for archiving, and a control unit that prevents from archiving transmitted or received image data when the image data is transmitted or received using a secured function. The facsimile apparatus can prevent unauthorized third parties from accessing the image data transmitted or received using the secured function.

Moreover, the facsimile apparatus of the present invention has a function for archiving transmission image data, and is provided for improving convenience when operating and managing archived documents, using broadcasting and batch transmission functions.

Furthermore, the facsimile apparatus of the present invention includes a unit, which instructs to create an e-mail without attaching image data and to transmit data based on a destination or a destination specification information including transmitted or received image data communication. For example, whether or not a communication activity journal is archived can be changed in every source of message or destination according to a degree of secrecy of transmitted or received image data.

A fourth aspect of the present invention is that a facsimile apparatus includes an archive specification unit that instructs to transmit image data to an e-mail address for archiving when transmitting the image data, a control unit that determines to archive transmission image data based on an instruction from the specification unit, an e-mail creation unit that creates an e-mail including image data transmitted by facsimile or via an Internet, and an archive unit that archives the created e-mail by transmitting to a predetermined e-mail address for archiving.

A fifth aspect of the present invention is that a facsimile apparatus includes a transmission unit that transmits essentially the same image data to broadcasting destinations by facsimile or via an Internet, an e-mail creation unit that creates e-mail including one of the image data transmitted by the transmission unit, and an archive unit that transmits an e-mail created in the e-mail creation unit to an e-mail address for archiving. Thus, the same image data transmitted using the broadcasting function is prevented from archiving more than once, and an archived document can be easily operated or managed.

Moreover, as a communication activity journal of all of the broadcasting destinations is described in an e-mail to be transmitted to the e-mail address for archiving only one transmission image data, detail information on the presence of communication error can be acquired in each of a plurality of communications transmitted using the broadcasting function.

Furthermore, data is not archived when the data cannot be transmitted to the all of the broadcasting destinations. Thus, only image data transmitted to destinations can be saved and the archived image data can be easily managed.

A sixth aspect of the present invention is that a facsimile apparatus includes a transmission unit that transmits a plurality of image data all at once by facsimile or via an Internet, an e-mail creation unit that creates one e-mail including a plurality of image data transmitted all at once for archiving, and an archive unit that transmits e-mails created in the e-mail creation unit based on an e-mail address for archiving. For example, the same file in the e-mail is prevented from saving more than once by a transmission time and transmitting destination in an archive destination of the archive terminal device, and the archived image data can be easily managed.

BRIEF DESCRIPTION OF THE DRAWINGS

FIG. 3A is a diagram showing an example of archive setting information table.

FIG. 3B is a diagram showing an example of archive setting information table.

FIG. 3C is a diagram showing an example of archive setting information table.

FIG. 3D is a diagram showing an example of archive setting information table.

FIG. 3E is a diagram showing an example of archive setting information table.

FIG. 4A is a diagram showing an example of archive management record file.

FIG. 4B is a diagram showing an example of archive management record file.

FIG. 10A is a diagram showing an example of table, which is applied in a facsimile apparatus in a second embodiment of the present invention.

FIG. 10B is a diagram showing an example of table, which is applied in a facsimile apparatus in a second embodiment of the present invention.

FIG. 11A is a diagram showing an example of archive management record file, which is applied in the facsimile apparatus in the second embodiment.

FIG. 11B is a diagram showing an example of archive management record file, which is applied in the facsimile apparatus in the second embodiment.

FIG. 17 is a diagram showing an example of archive management record file, which is applied in a facsimile apparatus in a forth embodiment of the present invention.

FIG. 19 is a diagram showing an example of screen for choosing archiving method, which is applied to the facsimile apparatus.

DETAILED DESCRIPTION OF THE INVENTION

Figure 1:
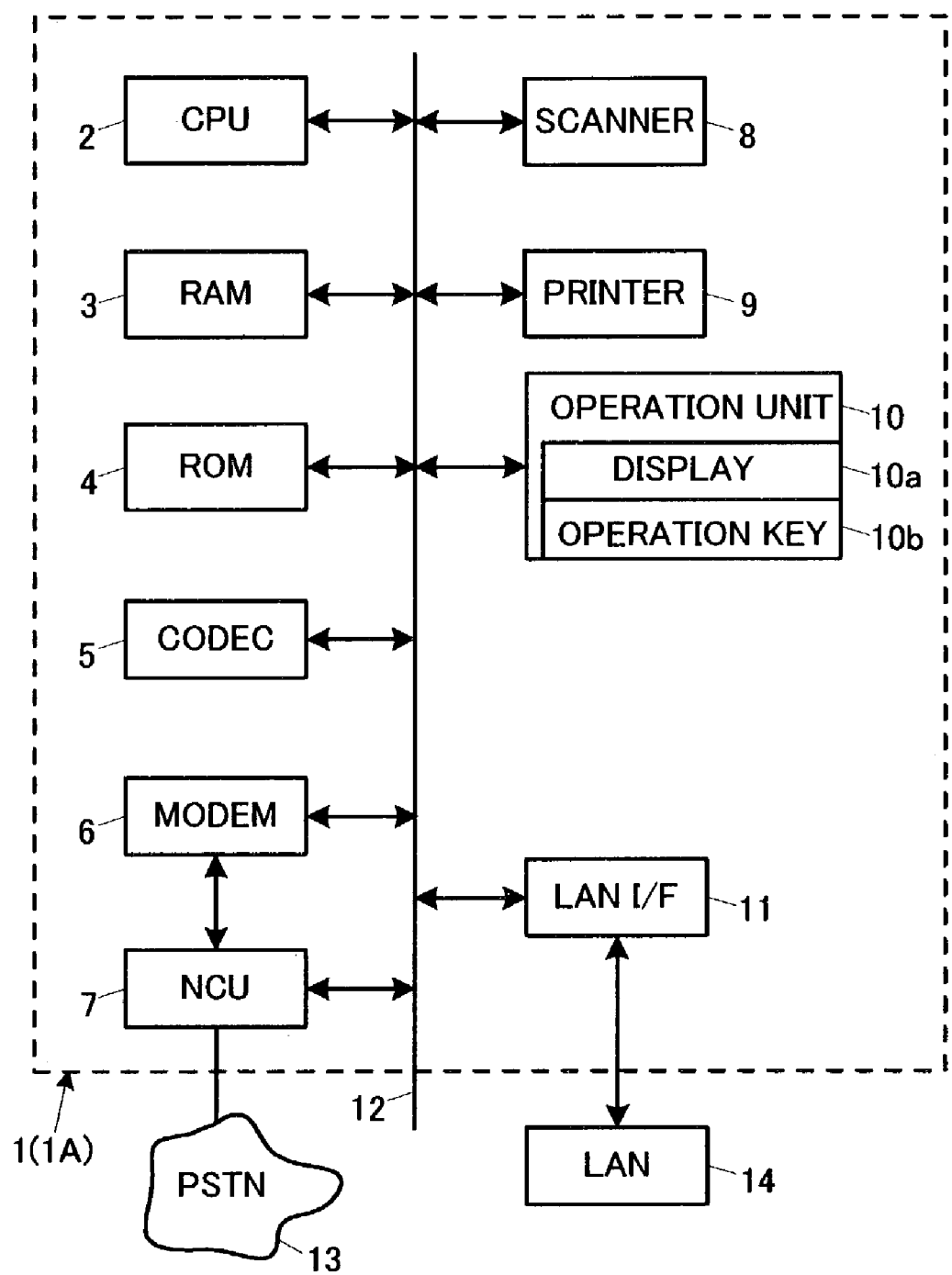
FIG. 1 is a block diagram showing a configuration example of facsimile apparatus according to a first embodiment of the present invention.

Hereinafter, a facsimile apparatus in embodiments of the present invention will be described with reference to figures. FIG. 1 shows an example of a configuration in the facsimile apparatus. A facsimile apparatus 1 includes CPU (Central Processing Unit) 2, RAM (Random Access Memory) 3, ROM (Read Only Memory) 4, CODEC (Coder and DECoder) 5, MODEM 6, NCU (Network Control Unit) 7, a scanner 8, a printer 9, an operation unit 10, and LAN I/F (Local Area Network Interface) 11. The parts from 2 to 11 are connected to a bus 12 so as to communicate.

The CPU 2 controls each part of the facsimile apparatus 1 based on a predetermined program.

The RAM 3 is functioned as a memory unit for storing a telephone number, e-mail address, and an activity journal file as described later or a storing unit for memorizing temporarily accumulated data.

The ROM 4 stores various programs for controlling operation in each part of the facsimile apparatus 1.

The CODEC 5 encodes and decodes data in conformity with a plurality of coding schemes. More specifically, read image data of a document is encoded for transmitting in conformity with MH (Modified Huffman) or MR (Modified READ) schemes, and decodes image data received from the outside. Moreover, data is encoded or decoded in conformity with a TIFF (Tagged Image File Format) scheme, which is a typical image data format when attaching in e-mail.

The MODEM 6 modulates transmission data and demodulates received data in conformity with ITU-T (International Telecommunication Union) Recommendation V.34 or similar standards.

The NCU 7 is a unit for controlling a telephone line to make or break a call, and is connected to a PSTN (Public Switched Telephone Network) 13.

The scanner 8, having a function of reading image data of a document, makes read image data into a binary format image and outputs the read image data to a predetermined output location by the instruction from the CPU 2.

The printer 9, adopting such as an electrophotographic process, prints received image data on a recording paper, and discharges the paper. For example, image data read in the scanner 8, image data received by facsimile, image data received via an Internet are printed on recording papers based on an instruction from the CPU 2.

The operation unit 10 includes a display 10a that shows information on the condition of the facsimile apparatus 1 and an instruction of various operations and a plurality of operation keys 10b for inputting a telephone number, specifying sending location using a speed dial, specifying a start of reading documents, and moving a reverse display in the display 10a, and they are operated from the operation unit 10.

The LAN I/F 11, having an interface with a LAN 14, is used in connecting the facsimile apparatus 1 so as to communicate with the LAN 14.

The facsimile apparatus 1, has a facsimile function for transmitting and receiving image data that is encoded in the MR, MMR (Modified Modified Read) schemes and an Internet facsimile function for transmitting or receiving image data attached in an e-mail, which is encoded in the TIFF, JPEG (Joint Photographic Experts Group) schemes by the equipped TCP/IP (Transmission Control Protocol/Internet Protocol) that is an Internet standard protocol.

Figure 2:
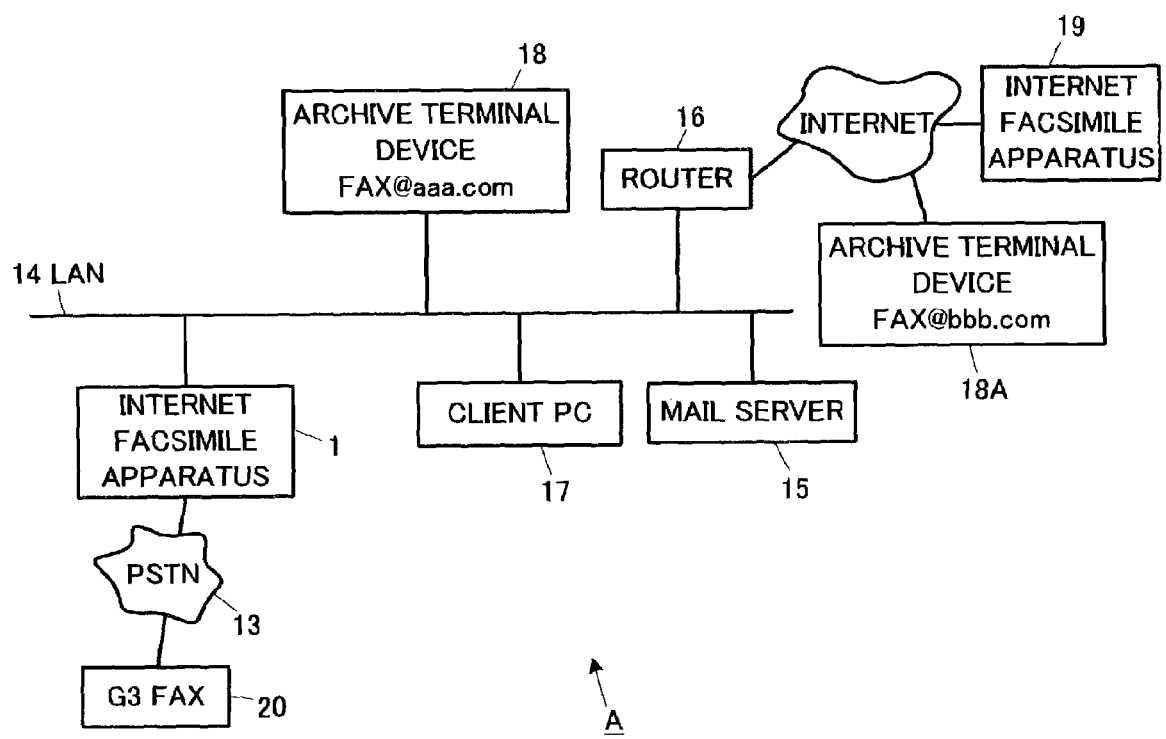
FIG. 2 is a diagram showing an example of network environment according to the first embodiment.

The facsimile apparatus 1, having a communication function, is used in a network environment A as illustrated in FIG. 2. More specifically, the facsimile apparatus 1 is connected to a mail server 15, a router 16, a client PC 17, and a terminal apparatus 18 for archiving (archive terminal apparatus) that is capable of receiving and accumulating e-mails so as to communicate. Furthermore, the facsimile apparatus 1 can transmit or receive image data to or from an Internet facsimile apparatus 19 through the mail server 15 and an Internet, to an archive terminal device 18A the same as the archive terminal device 18, and to a G3 (Group 3) facsimile terminal device 20 through the PSTN 13.

The facsimile apparatus 1 also has a function of saving (archiving) image data by transmitting the created e-mail attached transmitted or received image data (hereinafter called "e-mail for archiving") to a terminal device that is capable of receiving e-mail in the archive terminal device 18.

Moreover, as illustrated in FIGS. 3A~3E, the facsimile apparatus 1 forms archive setting information tables 21A~21E that are capable of editing the content by the operation from the operation unit 10 or the client PC 17 in the RAM 3. Information on whether to archive that instructs to create and transmit an e-mail for archiving, destination information described in a destination field of an e-mail for archiving (hereafter called "mail address for archiving"), a file format of image data to be archived, a file name of image data to be archived, and a message described in the "Subject:" field of a mail header of an e-mail for archiving (such information concerning archiving is called "archive setting information") are stored in the tables 21A~21E based on a communication type of transmitted or received image data. The facsimile apparatus 1 then creates an e-mail for archiving and transmits it to the archive terminal device 18, based on information in the tables 21A~21E specified by an operator.

The communication types also include communications using a batch function as described later, a polling function, or an F code function, and other communication types that are different from normal communications such as transmission to a specific account, an error mail, a receive confirmation, and remote transmission or reception, as well as a communication by facsimile or via an Internet. Moreover, as the message is described for improving the operation and management of data saved in the archive terminal device, the space for describing the message is not limited to the "Subject:" field, and the message can be described in a main text of e-mail or other field in the e-mail header by changing a control program.

Records T1~T21 corresponding to communication types are provided in the archive setting information tables 21A~21E, and each record includes a "communication type" field showing a communication type, a "need for archive" field storing the archive setting information, an "archive destination" field, a "file format" field, a "file name" field, and "message description" field.

In the archive setting information table 21A as illustrated in FIG. 3A, the "FAX transmission" record T1 that is referred to when the facsimile apparatus 1 transmits a facsimile, the "FAX reception" record T2 that is referred to when the facsimile apparatus 1 receives a facsimile, the "I-FAX transmission" record T3 that is referred to when the facsimile apparatus 1 transmits a facsimile via an Internet, and the "I-FAX reception" record T4 that is referred to when the facsimile apparatus 1 receives a facsimile via an Internet are provided. The CPU 2 in the facsimile apparatus 1 always refers to any one of the records T1~T4 in the table 21A after transmitting or receiving image data.

For example, when the facsimile apparatus 1 transmits a facsimile using a special function, the CPU 2 refers to the table 21B as illustrated in FIG. 3B as well as the table 21A. More specifically, the CPU 2 refers to the "FAX transmission-secure" record T5 when transmitting a facsimile using a secured function (a function of transmitting data such that only authorized receivers can print the data), refers to "batch" record T6 when transmitting a facsimile using the batch function (a function of accumulating image data of a plurality of documents and transmitting the data all at once), and refers to "polling" record T7 when transmitting a facsimile using the polling function (a function of accumulating image data of documents in a memory of the RAM 3 in advance and transmitting the data automatically by an instruction from the destination). Moreover, when an error occurs while transmitting a facsimile, the CPU 2 refers to "error" record T8.

The CPU 2 refers to the table 21C as illustrated in FIG. 3C as well as the table 21A when the facsimile apparatus 1 receives a facsimile using a specific function. More specifically, the CPU 2 refers to "FAX reception-secure" record T9 when receiving a facsimile using a secured function, refers to "F code" record T10 when receiving a facsimile using an F code function (communication function using a sub address or password in conformity with the standards of ITU-T), and refers to "polling" record T11 when receiving a facsimile using the polling function. Moreover, the CPU 2 refers to "error" record T12 when an error occurs while receiving a facsimile.

The CPU 2 also refers to the table 21D as illustrated in FIG. 3D as well as the table 21A when the facsimile apparatus 1 transmits a facsimile via an Internet using a specific function or setting. An "account" field is provided in the table 21D, as well as a field for setting the archive setting information. The CPU 2 refers to the "I-FAX transmission account 1" record T13 (an appropriate "I-FAX transmission account" record is referred to when a plurality of "I-FAX transmission account" records are formed in the table 21D) when transmitting a facsimile via an Internet to an e-mail address including an account described in the "account" field. Moreover, when a destination does not receive a facsimile from the facsimile apparatus 1 via an Internet, the CPU 2 refers to the "error" record T15. Furthermore, the CPU 2 refers to the "remote" record T16 when the facsimile apparatus 1 relays transmitted image data delivered from the client PC 17.

When the facsimile apparatus 1 receives a facsimile via an Internet using a specific function, the CPU 2 refers to the table 21E as illustrated in FIG. 3E as well as the table 21A. The "account" field is also provided in the table 21E as well as the field for setting the archive setting information. When the facsimile apparatus 1 receives a facsimile from an e-mail address including an account described in the "account" field via an Internet, the CPU 2 refers to "I-FAX reception account 1" record T17 (the appropriate "I-FAX reception account" record is referred to when a plurality of "I-FAX reception account" records are formed in the table 21E). Moreover, the CPU 2 refers to the "error" record T9 when image data received via an Internet cannot be analyzed normally, refers to the "receive confirmation" record T20 when the data received in advance is a received confirmation to the Internet facsimile that is a MDN (Message Disposition Notification) or DSN (Delivery State Notice), and refers to the "remote" record T21 when receiving a facsimile from the client PC17 via an Internet.

Moreover, as illustrated in FIGS. 4A and 4B, the CPU 2 forms an archive management record file 22, which stores an activity journal of image data attached in an e-mail and transmitted to the archive terminal device 18, in a predetermined area of the RAM 3. The archive management record file 22 has a "communication time" field showing a communication time, a "destination (source of message)" field showing destination information, a "number of pages" field showing the number of pages, "document size" field showing the size of the document such as an A4-size or B5-size document, a "resolution" field showing a resolution, a "communication result" field showing a communication result, an "archive destination" field showing an e-mail address of the archive destination, a "file name" field showing a file name of archived image data, a "file format" field showing a file format of archived image data, and a "message" field showing a message described in the "Subject:" field in the e-mail attached archived image data, which shows various information of the archived image data. The archive management record file 22 is updated by adding new records every time transmitting an e-mail for archiving, and the updated content is shown on a display of the client PC 17.

The facsimile apparatus 1, further has a function of converting a format of transmitted or received image data as well as the functions as described above, converting a format of accumulated transmitted or received image data and attaching the data in the e-mail for archiving, based on information described in the "file format" field in the archive setting information tables 21A~21E in a predetermined case.

Hereinafter, operations in every communication type, in case that image data is transmitted or received by the facsimile apparatus 1, will be described with reference to flow charts of FIGS. 5~8. In addition, operations as described later with reference to the flow charts follow instructions from the CPU 2 based on the control program stored in the ROM 4 of the facsimile apparatus 1.

Figure 5:
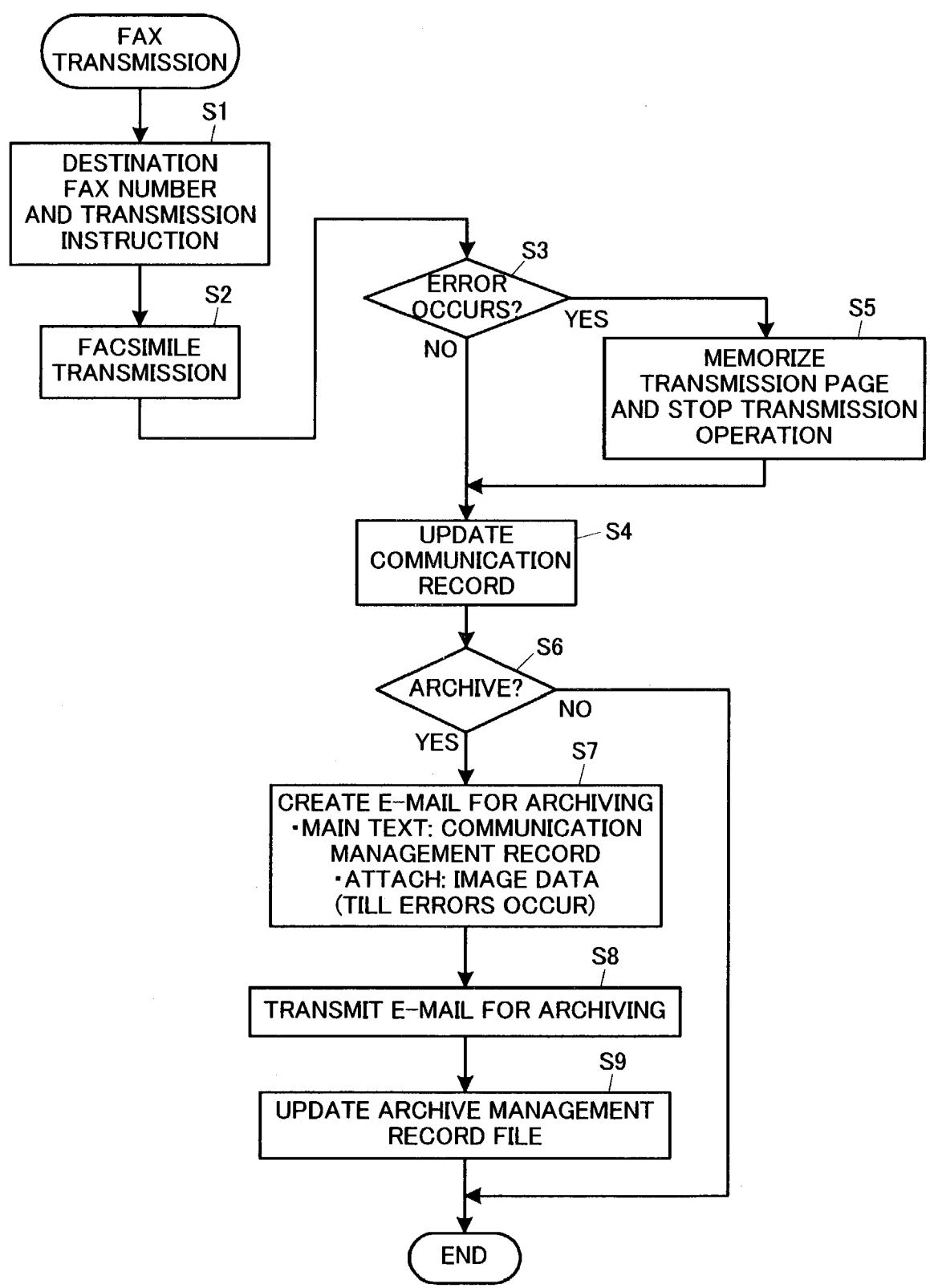
FIG. 5 is a flow chart showing operation when a facsimile apparatus in the first embodiment transmits facsimile.
Figure 6:
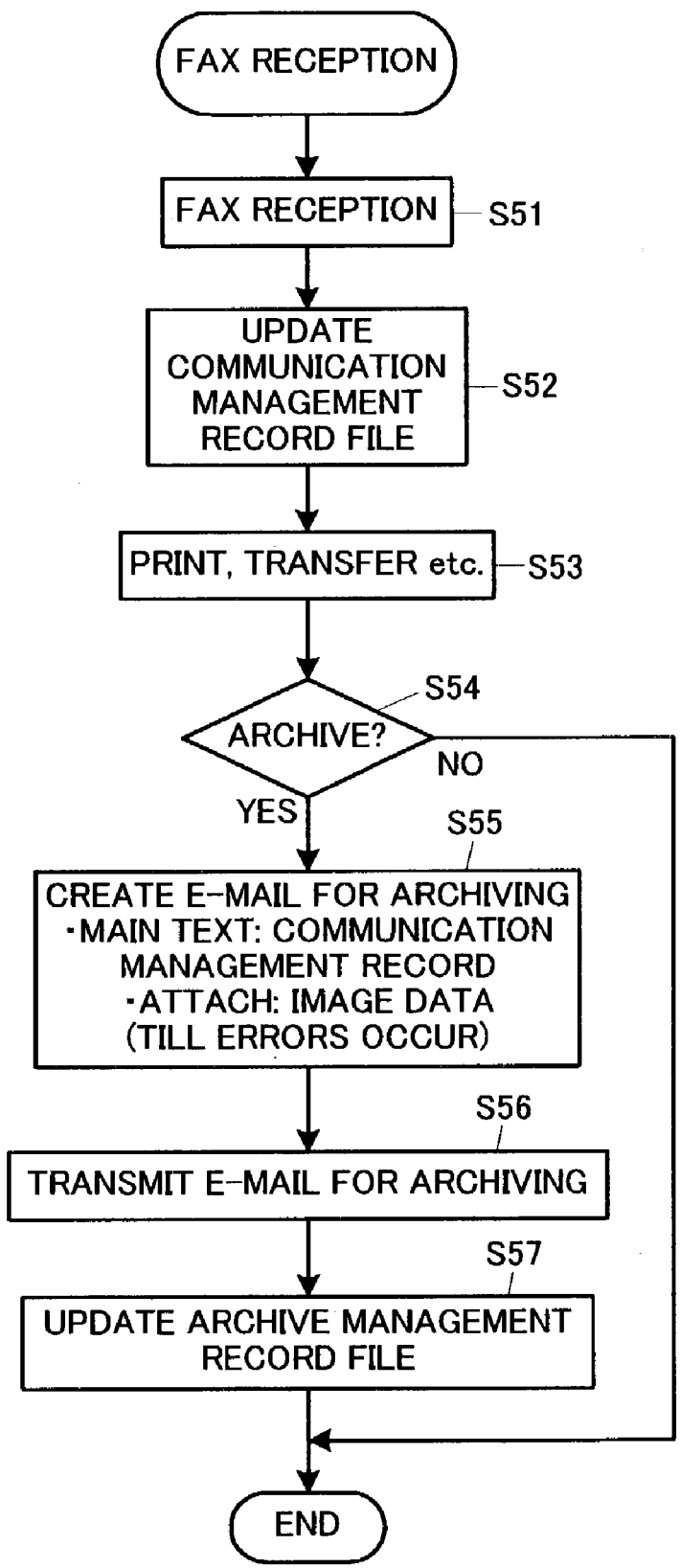
FIG. 6 is a flow chart showing operation when the facsimile apparatus in the first embodiment receives facsimile.
Figure 7:
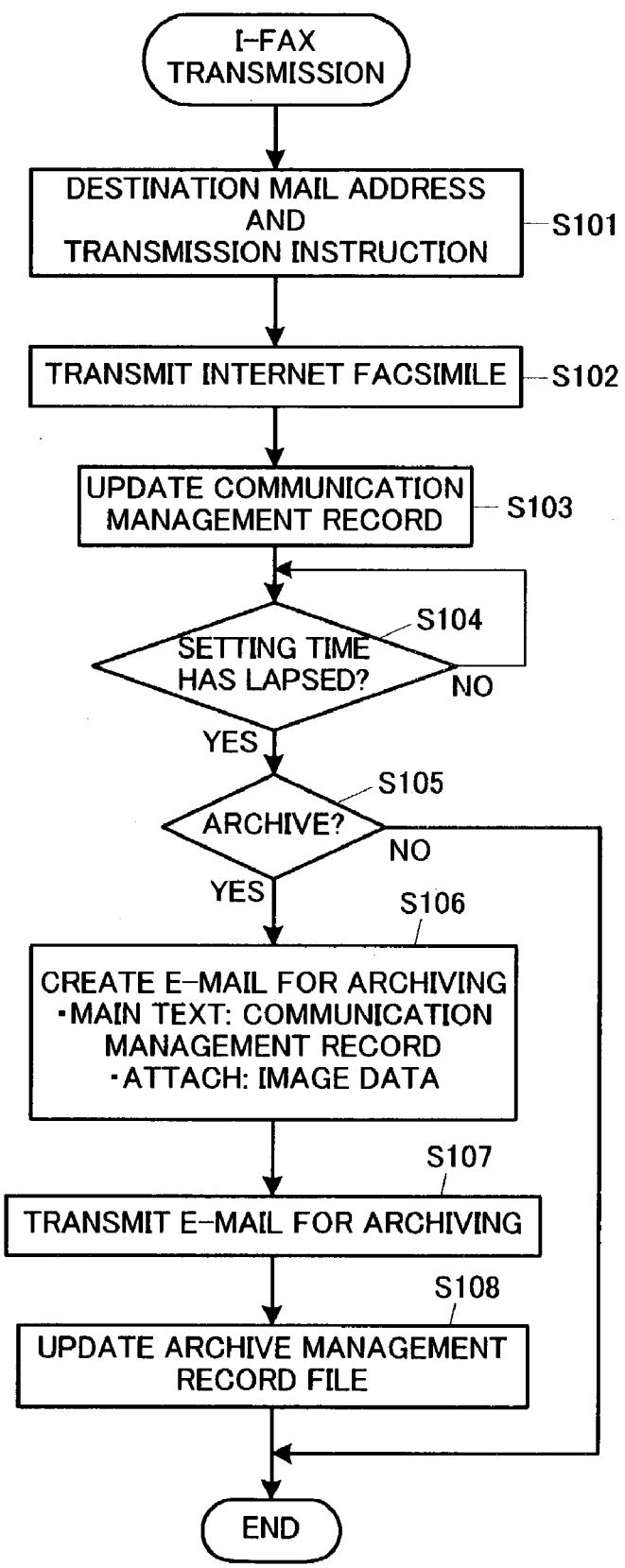
FIG. 7 is a diagram showing operation when the facsimile apparatus in the first embodiment transmits facsimile via an Internet.
Figure 8:
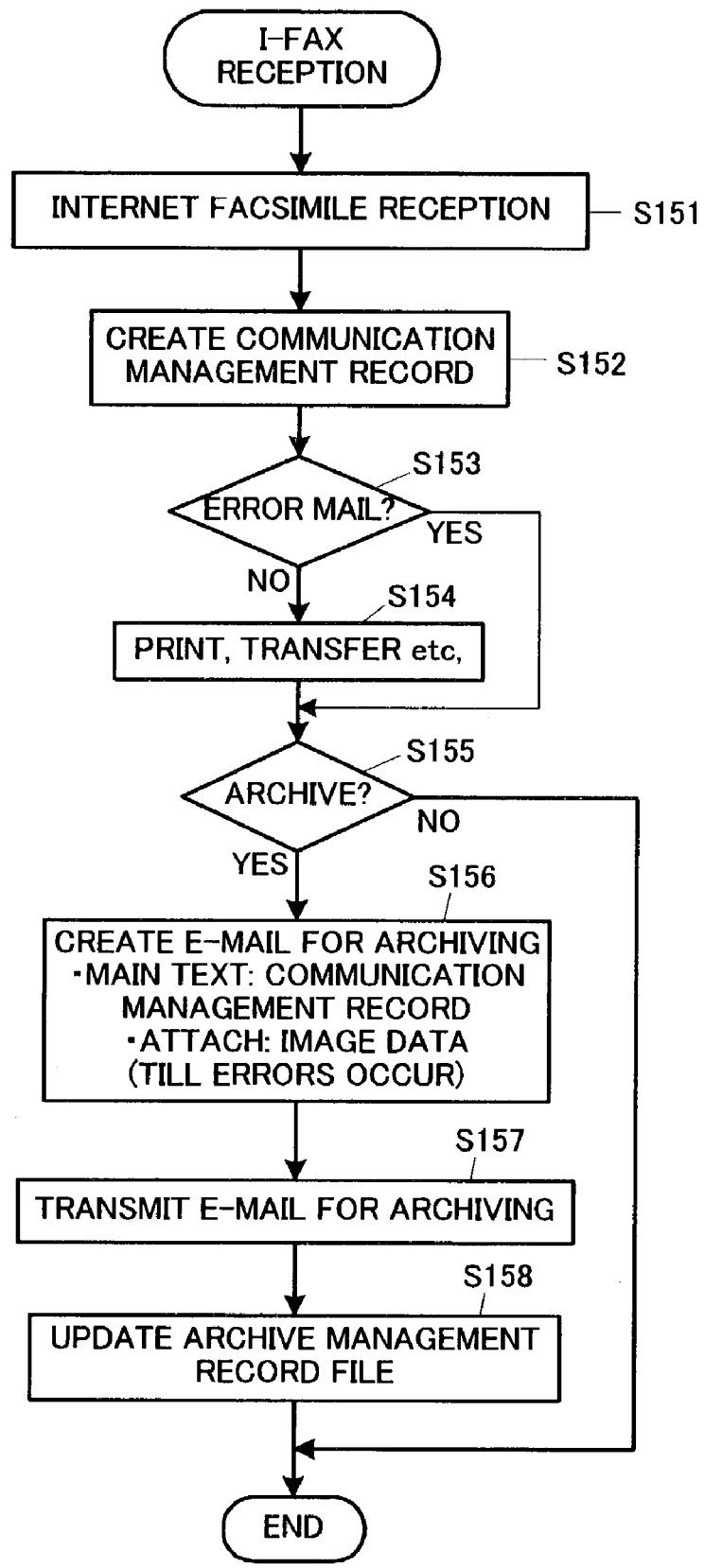
FIG. 8 is a diagram showing operation when the facsimile apparatus in the first embodiment receives facsimile via an Internet.

When an operator operates the operation unit 8 or the client PC 17 to specify a telephone number of a destination and instructs the transmission, as illustrated in FIG. 5, the facsimile apparatus 5 accepts the instructions (S1) and image data of a document is transmitted to a specified destination by facsimile (S2). When the data is transmitted normally (S3), the communication management record file is updated (S4). Moreover, when an error occurs while transmitting data by facsimile, the facsimile apparatus 1 updates the communication management record file (S4) after storing pages transmitted to the destination completely and stopping the transmission (S5).

Next, the CPU 2 determines to archive image data transmitted in S2 based on the tables 21A and 21B (FIGS. 3A and 3B) (S6). More specifically, when the data is not transmitted by facsimile using a special function, such as a "secure", "batch", or "polling" function and an error does not occur in S3, the CPU 2 determines to archive data based on information on a need for archive described in the "need for archive" field of the "FAX transmission" record T1 in the table 21A. In other words, the CPU 2 determines that data is archived when "Yes" is described in the "need for archive" field. When "No" is described in "need for archive" the CPU 2 determines not to archive.

Moreover, when data is transmitted using a special function by facsimile or when an error occurs in S3, the CPU 2 determined not to archive data when "No" is described in the "need for archive" field of the "FAX transmission" record T1 in the table 21A, and also refers to the table 21B when "Yes" is described in the field. The CPU 2 determines to archive data, based on the information on a need for archive described in the "need for archive" fields of the records T5~T7 correspond to the function set in the communication or described in the "need for archive" field of the "error" record T8 if an error occurs. For example, when data is transmitted by facsimile using the secure function, the CPU 2 determines to archive data when "Yes" is described in the "need for archive" field of the "FAX transmission" record T1 in the table 21A and the "FAX transmission-secure" record T5 in the table 21B, and determines not to archive data when "No" is described in the field.

Figure 9:
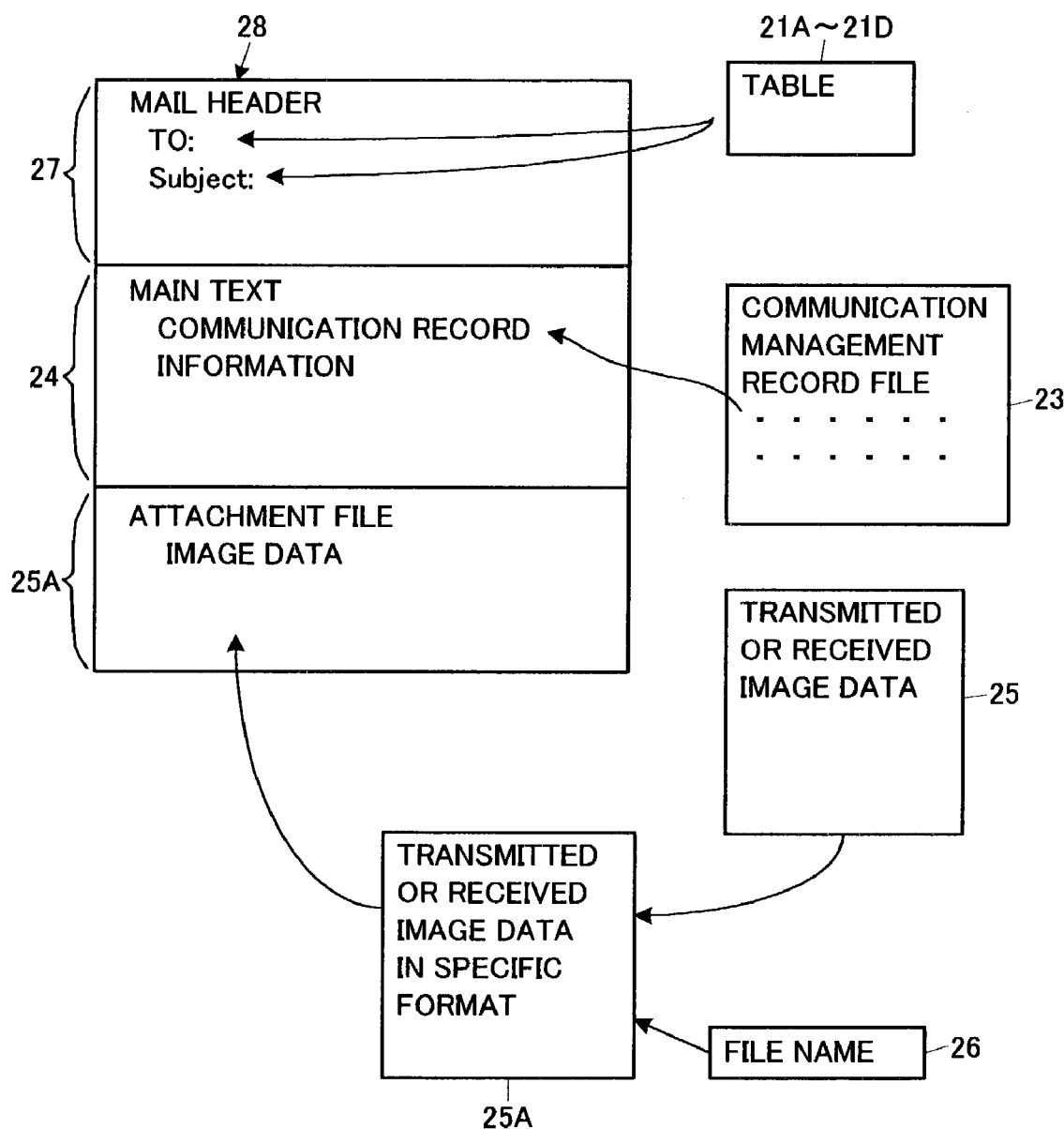
FIG. 9 is an explanation drawing when the facsimile apparatus in the first embodiment creates e-mail for archiving.

When the CPU 2 determines to archive data, as illustrated in FIG. 9, the communication activity journal on the transmission is extracted from a communication management record file 23, and it is described in an e-mail text 24 of e-mail. Next, the CPU 2 describes a message described in the "message description" field of a record applied for determining to archive image data 25 transmitted in S2 in S6 (hereafter called "application record") in the "Subject:" field of an e-mail header 27. The CPU 2 converts data to the image data 25 in a format described in the "file format" field, gives the data a file name, a part of which includes information described in the "file name" field of the application record (for example, a beginning part of file name), and attaches the data to the main text 24 of the e-mail. Moreover, the CPU 2 describes an e-mail address described in the "archive destination" field of the application record in the "To:" field of the mail header 27 of the e-mail, and creates the e-mail 28 for archiving (S7). However, only the image data stored in S5 and completed to transmit is attached when an error occurs.

Lastly, the facsimile apparatus 1 creates the e-mail for archiving, transmits it to the archive terminal devices 18 or 18A (S8), and updates the archive management record file 22 (FIG. 4A) (S9).

Next, the operation in case that the facsimile apparatus 1 receives a facsimile will be described. As illustrated in a flow chart of FIG. 6, when the facsimile apparatus 1 receives a facsimile or when the facsimile apparatus 1 cannot receive a part of or the entire documents due to an error while receiving the facsimile (S51), the communication management record file 23 of the reception is updated (S52), and the received image data is processed to be printed or transferred (S53).

Next, the CPU 2 determines to archive image data received in S51 (information other than image data when image data is not received by an error) (S54). More specifically, when the facsimile apparatus 1 receives a facsimile without using a "secure", "F-code", or "polling" function and an error does not occur in S51, the CPU 2 determines to archive data based on the information on a need for archiving that is described in the "need for archive" field of the "FAX reception" record T2 in the table 21A.

On the other hand, when a facsimile is received using some function or when an error occurs in S51, the CPU 2 determines not to archive data when "No" is described in the "need for archive" field of the "FAX transmission" record T2 in the table 21A, and also refers to the table 21C when "Yes" is described in the field. The CPU 2 determines to archive data based on the information on the need for archive described in the "need for archive" field of the records T9~T11 corresponding to the function set in the communication or the "need for archive" field of the "error" record T12 in case that an error occurs in S51. For example, when data is received using the secured function, the CPU 2 determines to archive data when "Yes" is described in the "need for archive" field of the "FAX reception" record T2 in the table 21B and the "FAX reception-secure" record T9 in the table 21C, and determines not to archive data when "No" is described in the field.

As described in S7, when the CPU 2 determines to archive data, the e-mail 28 for archiving is created based on the information specified in each field of the application record for determining to archive data in S54 (S55). However, only the image data in received pages is attached in the e-mail 28 for archiving when an error occurs in S51 and image data in the entire pages cannot be received. Moreover, image data is not attached in the e-mail 28 for archiving when image data cannot be received.

Lastly, the facsimile apparatus 1 transmits the e-mail 28 for archiving created in S55 to the archive terminal device 18 or 18A (S56), and updates the archive management record file 22 (FIG. 4B) (S57).

Next, operation in case that the facsimile apparatus 1 transmits a facsimile via an Internet will be described. As illustrated in a flow chart of FIG. 7, when an operator operates the operation unit 8 or the client PC 17 to specify an e-mail address of the destination and instruct the transmission, the Internet facsimile apparatus 1 accepts the instructions (S101), transmits image data of a document to the specified sending destination by facsimile via an Internet (S102), and updates a communication management record file (S103).

After the CPU 2 has waited until a setting time (time set by an operator using an apparatus) has lapsed in order to secure a time for returning an error e-mail (an e-mail replied from an e-mail server when a facsimile transmitted in advance is not normally received at a destination) (S104), the CPU 2 determines to archive image data transmitted in S102 based on the tables 21A and 21D (S105). More specifically, when data is transmitted by facsimile via an Internet to an e-mail address without including any account specified in the "account" field of the table 21D, the transmission is not using a remote function from the client PC 17 (transmission of image data delivered from the client PC 17), and an error e-mail is not received in waiting in S104, the CPU 2 determines to archive data based on information on the need for archive specified in the "need for archive" field of the "IFAX transmission" record T3 in the table 21A.

On the other hand, when the transmission is applied in any case as described above, the CPU 2 determines not to archive data when "No" is described in the "need for archive" field of the "I-FAX transmission" record T3 in the table 21A, and also refers to the table 21D when "Yes" is described in the "need for archive" field. The CPU 2 determines to archive data based on the information specified in the "need for archive" field of the records T13, T14, and T16 corresponding to the condition set in the transmission or the "need for archive" field of the "error" record T15. For example, when data is transmitted in S101 by facsimile via an Internet to an e-mail address whose account is "zzz" specified in the "account" field of the "account2" record T14, the CPU determines to archive data when "Yes" is described in the "need for archive" field of the "I-FAX transmission" record T3 in the table 21A and "Yes" is described in the "need for archive" field of the "account2" record T14 in the table 21D, and determines not to archive data when "No" is described in the fields. In addition, when the facsimile apparatus 1 receives an error e-mail in waiting in S104, the CPU 2 refers to the "error" record T15.

When the CPU 2 determines to archive data, as described in S7, the e-mail 28 for archiving is created based on the information specified in the application record in order to determine to archive data in S105 (S106). However, image data is not attached in e-mail 28 for archiving when an error e-mail is received in waiting time in S104.

Lastly, the facsimile apparatus 1 creates the e-mail 28 for archiving, transmits it to the archive terminal device 18 in S106 (S107), and updates the archive management record file 22 (FIG. 4A) (S108).

Next, the operation in case that the facsimile apparatus 1 receives a facsimile via an Internet will be described. As illustrated in a flow chart of FIG. 8, the facsimile apparatus 1 receives a facsimile via an Internet (S151), the CPU 2 updates the communication management record file on the reception (S152). When an e-mail received in advance is not an error e-mail showing that data is not normally transmitted by facsimile via an Internet (S153), the normal reception process such as printing and delivering is carried out (S154).

After carrying out a process of S154 or after determining that the e-mail received in S153 is an error e-mail, the CPU 2 determines to archive the image data received in S151 based on the tables 21A and 21E (S155). More specifically, when data is transmitted by facsimile via an Internet to any account specified in the "account" field of the table 21A, the data is not concerned with an error or a reception to the facsimile transmitted via an Internet, and the data is not transmitted to the client PC 17, the CPU 2 determines to archive the data based on the information described in the "need for archive" field of the "I-FAX transmission" record T4.

On the other hand, when the transmission is applied in any case as described above, the CPU 2 determines not to archive data when "No" is described in the "need for archive" field of the "I-FAX reception" record T4 in the table 21A, and also refers to the table 21E when "Yes" is described in the "need for archive" field. The CPU 2 determines to archive data based on the information specified in the "need for archive" field of the records T17~T21 corresponding to the conditions set in the communication.

For example, when receiving a facsimile from the client PC whose account is "bbb" specified in the "account" field of the "I-FAX reception-account 1" record T17 via an Internet, the CPU 2 determines to archive data when "Yes" is described in the "need for archive" field of the "I-FAX reception" record in the table 21A and "Yes" is described in the "need for archive" field of the "I-FAX reception-account 1" in the table 21E, and determines not to archive data when "No" is described in the fields. Moreover, when receiving an error e-mail in S151, the CPU 2 determines to archive data when "Yes" is described in the "need for archive" field of the "I-FAX reception" record T3 in the table 21A and "Yes" is described in the "need for archive" of the "error" record T19 in the table 21E, and determines not to archive data when "No" is described in the fields.

When the CPU 2 determines to archive data, as described in S7, the e-mail 28 for archiving is created based on the information described in each field of the application field applied for determining to archive data in S155 (S156).

Lastly, the facsimile apparatus 1 creates and e-mail 28 for archiving, transmits it to the archive terminal device 18 in S156 (S157), and updates the archive management record file 22 (FIG. 4B) (S158).

Hereinafter, a facsimile apparatus in a second embodiment of the present invention will be described. As illustrated in FIGS. 1 and 2, a facsimile apparatus 1A has the same configuration and function as the one in the facsimile apparatus 1 and is used in the same network environment A. However, the apparatus is different in that image data is not archived using the secured transmission function.

The facsimile apparatus 1 has a secured transmission function that an authorized receiver (a person who knows a password) can print or deliver data, and the secured transmission can be used in transmitting by facsimile or via an Internet. When transmitting facsimile using the secured function, for example, a transmitter specifies an address by the F-code function (transmission function using a sub address or password in conformity with the ITU-T recommendation) or delivers information showing the secured communication in a facsimile communication procedure, and a receiver recognizes that the communication is made using the secured function by acquiring information showing the sub address or secure communication and stores the image data to a predetermined memory box (a memory area allocated in the RAM 3). For example, when transmitting a facsimile via an Internet using the secured function, information showing that data is transmitted using the secured function is described in a predetermined area in an e-mail header or a main text of e-mail transmitted by a transmitter, and a receiver that receives the e-mail recognizes that the communication is made using the secured function by acquiring the information and stores the image data in the memory box. Thus, whether or not data is transmitted by facsimile via an Internet using the secured function is determined by the specific sub address and the information showing that the communication is made in the secured function.

Moreover, the facsimile apparatus 1 forms tables 121A and 121B that can be freely edited from the operation unit 10 or the client PC 17 by an operator as illustrated in FIG. 10 in a predetermined area of the RAM 3. The tables 121A and 121B include a "condition" field specifying various conditions, a "create e-mail without attaching image data" field specifying to archive the e-mail without attaching image data based on a condition specified in the appropriate field, and a "keyword" field specifying a keyword (for example, a message that can freely be input by an operator) described in an e-mail address for archiving or the "Subject:" field of an e-mail without attaching image data (other area in an e-mail header or an e-mail text of the e-mail can be used as well as the "Subject:" field).

For example, data is transmitted or received to or from a destination described after "to=" when "to=" is described in the "condition field", the facsimile having a telephone number described after "TSI=" when "TSI=" is described in the field, the Internet facsimile apparatus of an e-mail address described after "from=" when "from=" is described in the field, the Internet facsimile apparatus describing a message after the "subject=" in the "Subject:" field of the e-mail header when "subject=" is described in the field, and the facsimile setting a sub address described after "sub address" when "sub address=" is described in the field.

Moreover, the facsimile apparatus 1 accumulates information of a communication time, a destination (source of messages), a number of pages, a document size as an activity journal after transmitting or receiving image data, and forms a communication management record file (not shown in the drawings) showing the contents to the display 10a and the clients PC 17 according to the request from an operator and an archive management record file 122 accumulating an archive destination and keyword information as well as the information as described above as illustrated in FIG. 11 respectively in a predetermined area of the RAM 3.

Figure 12:
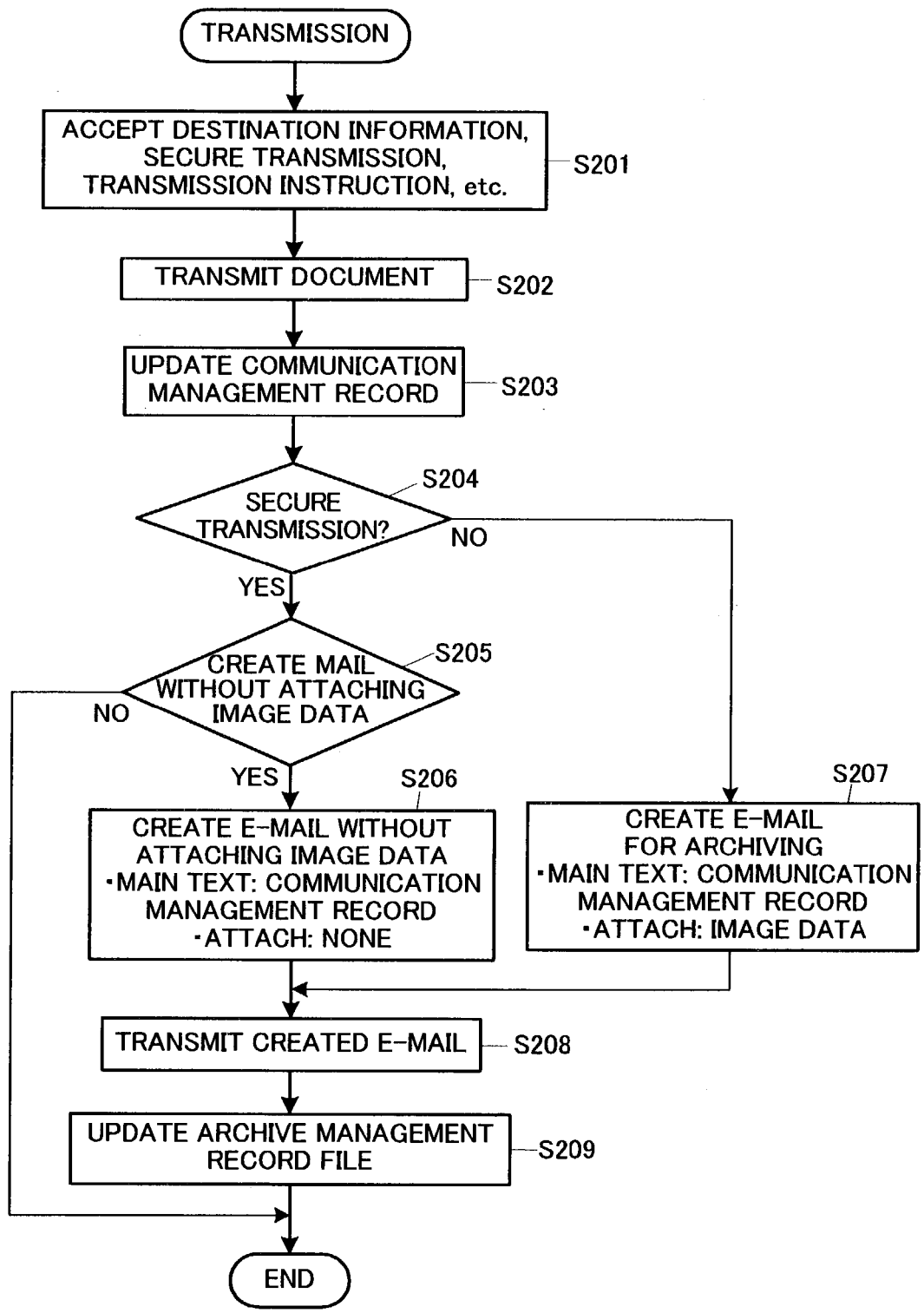
FIG. 12 is a flow chart showing transmitting operation of the facsimile apparatus in the second embodiment.
Figure 13:
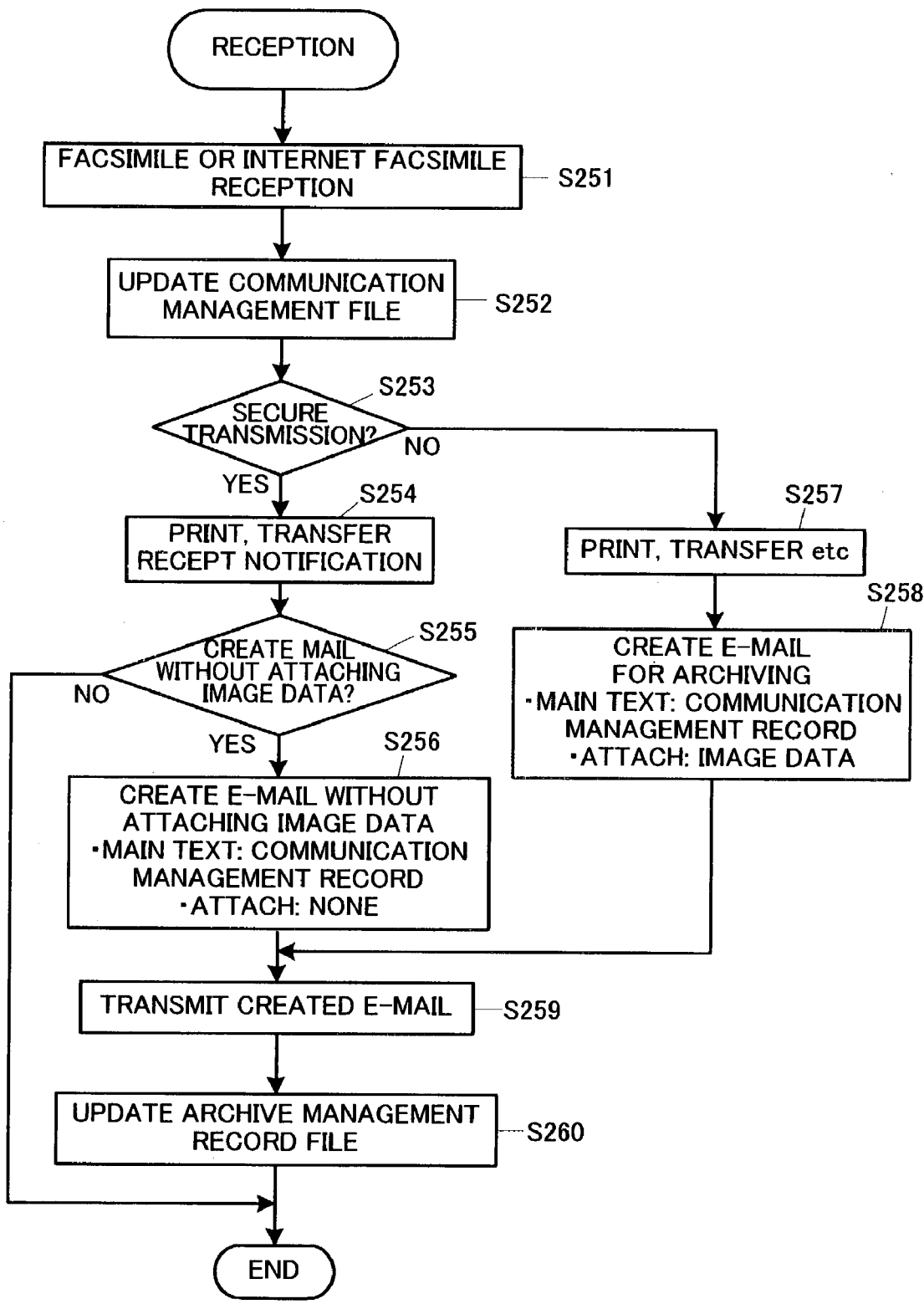
FIG. 13 is a flow chart showing receiving operation of the facsimile apparatus in the second embodiment.

Hereinafter, operation in the case that image data is transmitted or received by the facsimile apparatus 1 will be respectively described with reference to flow charts of FIGS. 12 and 13. Additionally, in a specification of the present invention, the operation described with reference to flow charts as described later is carried out according to the instructions from the CPU 2 based on a control program stored in the ROM 4 of the facsimile apparatus 1. Moreover, an e-mail address for archiving is set in the operation unit 10 or the client PC 17 in advance by an operator, and is stored in a predetermined area of the RAM 3.

When an operator sets a document and specifies sending destination information (a telephone number or an e-mail address), transmission instruction, and secured transmission if desired, the facsimile apparatus 1 accepts the instruction (S201), transmits a document to a specific sending destination, and updates a communication management record file (S203).

When accepting the transmission using a secured function in S201 (S204), the CPU 2 determines to create the e-mail without attaching the image data transmitted in S202 based on the table 121A (FIG. 10A) (S205). More specifically, when a transmission corresponds to the condition specified in the "condition" field, the CPU 2 creates an e-mail without attaching the image data when "Yes" is described in the "e-mail without attaching image data" field specifying the condition, and determines not to create an e-mail without attaching the image data when "No" is described in the field. Moreover, the CPU 2 determines to create the e-mail without attaching image data when a transmission does not correspond to a condition described in the "condition" field.

Figure 14A:
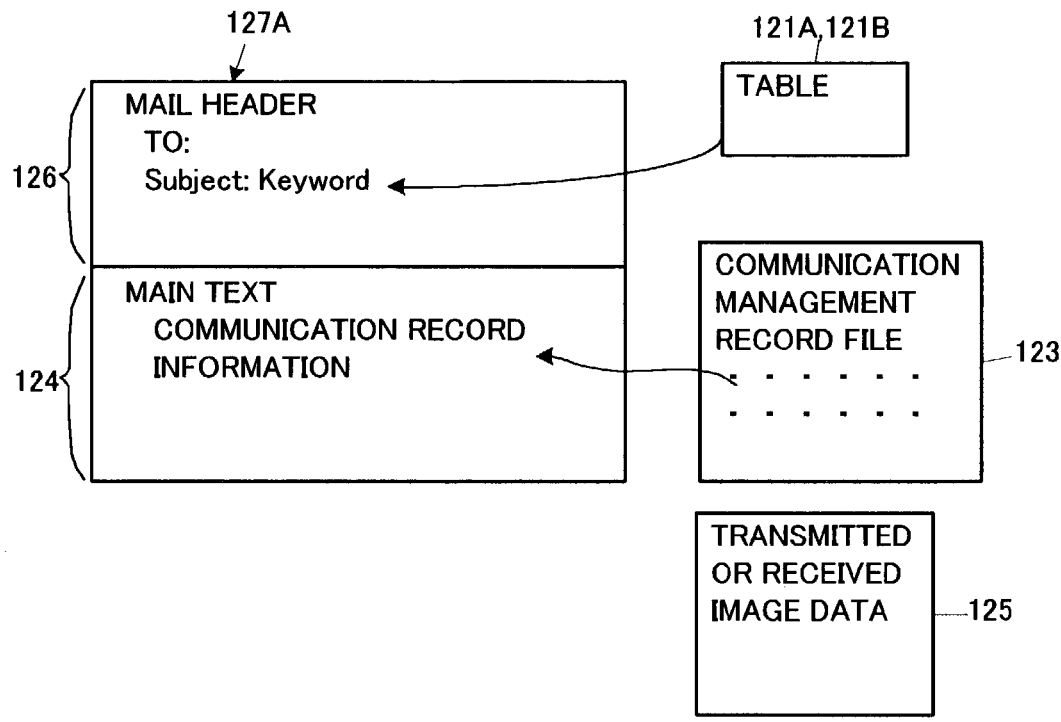
FIG. 14A is an explanation drawing when the facsimile apparatus in the second embodiment creates e-mail for archiving.

The CPU 2 then extracts a communication activity journal of the transmission from a communication management record file 123 and describes it in a main text 124 as illustrated in FIG. 14A when determining to create the e-mail without attaching image data, describes an appropriate keyword in the "Subject:" field of an e-mail header 126 when the transmission corresponds to any condition specified in the "condition" field of the table 121A (FIG. 10A), and creates an e-mail without attaching image data 127A by describing an e-mail address for archiving in the "To:" field of the e-mail header 126 without attaching image data 125 transmitted in S202 (S206). Additionally, the CPU 2 terminates a series of operations when determining to create the e-mail without attaching image data 127A.

Figure 14B:
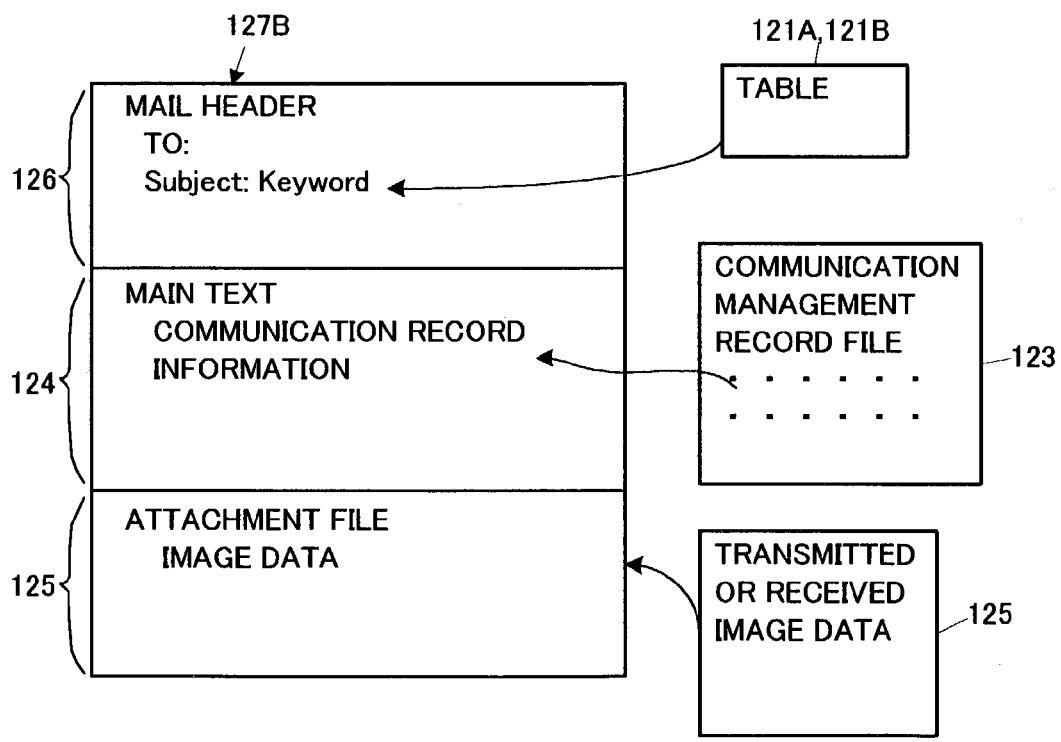
FIG. 14B is an explanation drawing when the facsimile apparatus in the second embodiment creates e-mail for archiving.

On the other hand, when the CPU 2 determines not to transmit data using the secured function in S204, as illustrated in FIG. 14B, a communication activity journal of the transmission is extracted from the communication management record file 123 and described in the main text 124, attaches the image data 125 of the document transmitted in S202 in the e-mail, describes a keyword corresponding to any condition specified in the "condition" field of the table 121A, and an e-mail for archiving 127B is created by describing an e-mail address for archiving in the "To:" field of the e-mail header 126 (S207).

Lastly, the facsimile apparatus 1 transmits the e-mails 127A and 127B created in S206 or S207 to the archive terminal device 18 (S208), and updates the archive management record file 122 (FIG. 11A) (S209). Additionally, as an e-mail address specified as an archive destination is described in the "archive destination" and a keyword described in the "Subject:" field of the e-mails 127A and 127B is described in the "keyword" field as well as a communication time and destination (source of messages) when updating as illustrated in the drawings, an archive destination and transmitted or received image data accumulated in the archive destination can be easily searched.

Next, the operation in case that the facsimile apparatus receives image data will be described with reference to FIG. 13.

When the facsimile apparatus 1 receives data by facsimile or by facsimile via an Internet (S251), the communication management record file of the reception is updated (S252).

When the received image data is transmitted using the secured function (S253), the facsimile apparatus 1 prints a receipt notification for notifying that image data is received using the secured function or transfers it (S254).

The CPU 2 determines to create the e-mail without attaching image data received in S251 based on the table 121B (FIG. 10B) (S255). More specifically, when the reception is corresponds to the condition described in the "condition" field, the CPU 2 creates the e-mail without attaching image data when "Yes" is described in the "e-mail without attaching image data" specifying on the condition, and determines not to create the e-mail without attaching image data when "No" is described in the field. Moreover, when the reception does not correspond to the condition described in the "condition" field, the CPU 2 determines to create the e-mail without attaching image data.

When the CPU 2 determines to create the e-mail without attaching image data, as illustrated in FIG. 14A, a communication activity journal of the reception is extracted from the communication management record file 123 and is described in the main text 124. Moreover, when the reception corresponds to any condition specified in the "condition" field of the table 121 (FIG. 10B), the CPU 2 describes an appropriate keyword in the "Subject:" field of the e-mail header 126, and creates the e-mail without attaching image data 127A described in the "To:" field of the e-mail header 126 without attaching the image data 125 received in S251

(S256). Additionally, the CPU 2 terminates a series of operation when determining not to create the e-mail without attaching image data 127A.

On the other hand, when the CPU 2 determines not to receive data using the secured function in S253, a normal reception process is carried out such as printing or delivering (S257). As illustrated in FIG. 14B, the CPU 2 extracts a communication activity journal of the reception from the communication management record file 123 and describes it in the main text 124, and attaches the image data 125 of a document received in S251 in the e-mail. When the e-mail corresponds to any condition specified in the "condition" field of the table 121B (FIG. 10B), the CPU 2 describes an appropriate keyword in the "Subject:" field of the e-mail header 126, and creates the e-mail 127 for archiving by describing the e-mail address for archiving in the "To:" field of the e-mail header 126 (S258).

Lastly, the facsimile apparatus 1 transmits the e-mails 127A and 127B created in S256 or S258 to the archive terminal device 18 (S259), and updates the archive management record file 122 (FIG. 11B) (S260).

Hereinafter, a facsimile apparatus in a third embodiment of the present invention will be described. As illustrated in FIGS. 1 and 2, the facsimile apparatus has the same configuration and function as the one in the facsimile apparatus 1 according to the first and second embodiments, and is used in the same network environment A. However, the facsimile apparatus is different from the one in the first and second embodiments in that an operator determines to archive image data to be transmitted using the secured function and the facsimile apparatus 1 is operated (determines) based on the instruction.

Figure 15:
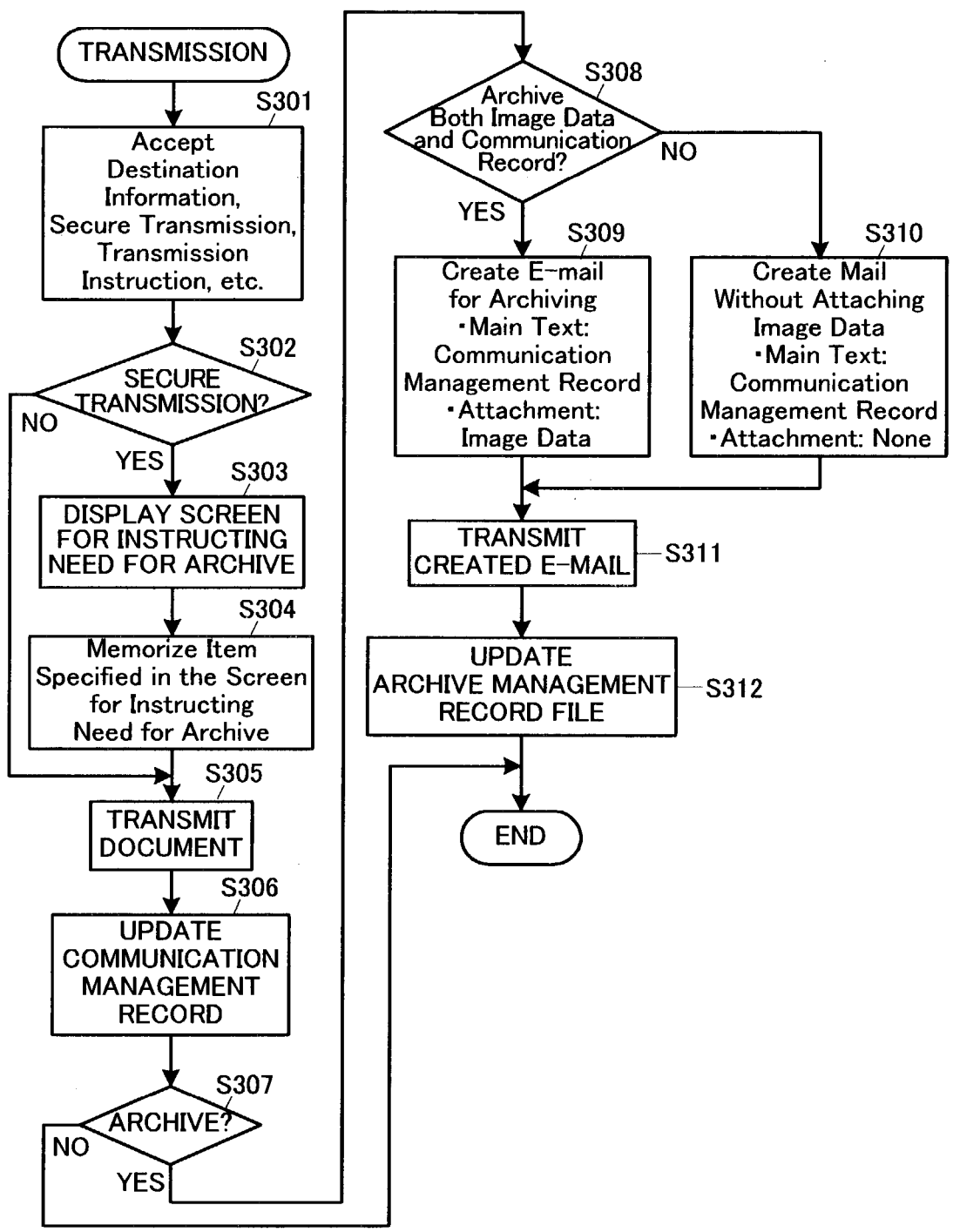
FIG. 15 is a flow chart showing transmitting operation of a facsimile apparatus in a third embodiment of the present invention.
Figure 16:
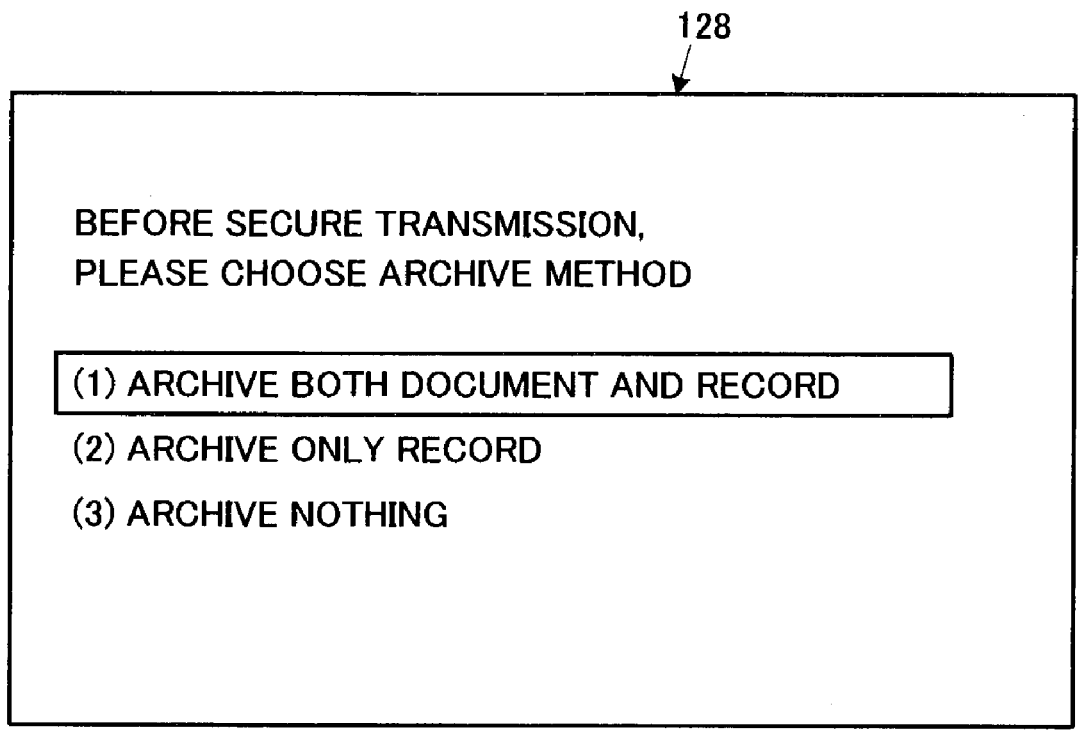
FIG. 16 is a diagram showing an example of screen showing a need for archiving data in the facsimile apparatus in the third embodiment.

More specifically, as illustrated in a flow chart of FIG. 15, the facsimile apparatus 1 accepts an instruction of the secured transmission when an operator sets a document, inputs sending destination information, instructs to transmit it using the secured function (S301). When the secured transmission is specified (S302), a screen 128 for showing the need for archiving, including optional items such as "(1) archive document and activity journal", "(2) archive only activity journal", and "(3) archive nothing", as illustrated in FIG. 16, is shown in the display 10a or a display of the client PC 17 (S303), and the facsimile apparatus waits for an instruction to choose an archiving method from an operator. After an operator chooses some instruction from the screen 128 for showing the need for archiving, the facsimile apparatus 1 stores the chosen item in the RAM 3 (S304).

After determining that it is not the secured transmission in S304 or S302, the facsimile apparatus 1 transmits image data of a document to a specified destination (S305), and updates the communication management record file (S306).

When the item "(3) archive nothing" is stored in S304 or when determining that the transmission is not made using the secured function in S302, the CPU 2 determines not to archive both image data and the communication activity journal (S307), and a series of operation is terminated.

On the other hand, when the item "(1) archive document and activity journal" is stored in S304, as illustrated in the second embodiment, the CPU 2 creates the e-mail for archiving 127B (FIG. 14B) including transmission image data (S308, S309), and creates the e-mail without attaching image data 127A (FIG. 14A) when the item "(2) archive only activity journal" is stored in S304 (S308, S310).

Lastly, the facsimile apparatus 1 transmits the e-mails 127A and 128B created in S309 or S310 to the archive terminal device 18 (S311), and updates the archive management record file 122 (FIG. 11A) (S312).

Hereinafter, a facsimile apparatus according to a fourth embodiment of the present invention will be described. As illustrated in FIGS. 1 and 2, the facsimile apparatus 1A has the same configuration and function as the one according to the first embodiment, and is used in the same network environment A. However, the apparatus is different in that only one image data is archived in the secured transmission. As illustrated in FIG. 17, an archive management record file 221 that accumulates an e-mail address of archiving destination in the "archive destination" field is formed in a predetermined area of the RAM 3 as well as similar information as described above.

Figure 18:
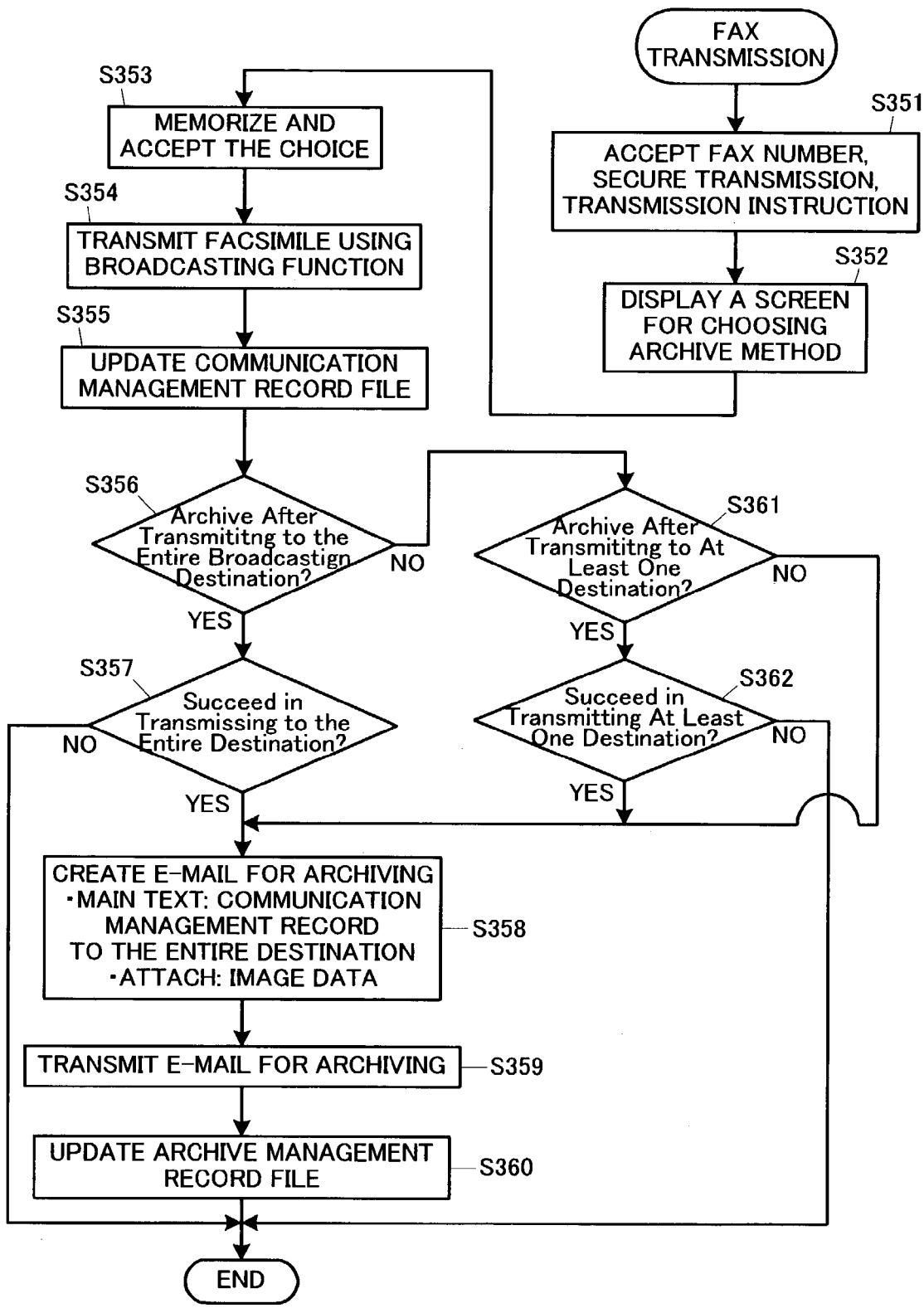
FIG. 18 is a flow chart showing operation when the facsimile apparatus in the forth embodiment transmits data using broadcasting function.

Hereinafter, operation in case that image data of a document is transmitted using the broadcasting function by the facsimile apparatus 1 will be described with reference to the flow chart of FIG. 18. Additionally, an e-mail address for archiving as described later is set in the operation unit 10 or the client PC 17 by an operator in advance, and stored in a predetermined area of the RAM 3. Moreover, in this specification, the operation as described later with reference to flow charts follows an instruction from the CPU 2 based on the control program stored in the ROM 4 of the facsimile apparatus 1.

When an operator sets a document, inputs a telephone number of a plurality of destinations, and instructs to transmit using the broadcasting function, the facsimile apparatus 1 accepts the instruction (S351), and an archive method choice screen 222 showing three items of "(1) archive when data is transmitted successfully to all of the broadcasting destinations", "(2) archive when data can be transmitted successfully to at least one destination", and "(3) always archive", as illustrated in FIG. 19, for an operator to choose the archiving method, is shown in a display 10a or the display of client PC 17 (S352). When an operator chooses an instruction from the screen, the facsimile apparatus 1 accepts the specified item and stores it (S353), and image data of the document is transmitted sequentially to a plurality of destinations specified by the broadcasting transmission (S354). After the data is transmitted to all of the broadcasting destinations, the communication management record file is updated (S355). If an error occurs while transmitting, "error" is described as the information for notifying it in the "communication result" field of the communication management record file (not shown in the drawings), and "OK" is described as the information for notifying it when transmission is normally completed.

Figure 20A:
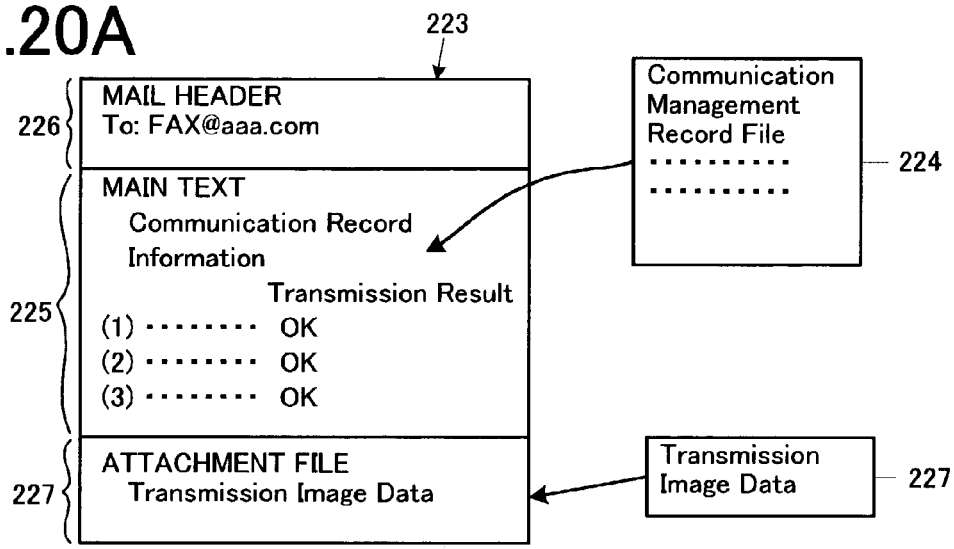
FIG. 20A is an explanation drawing of e-mail for archiving, which is created after the facsimile apparatus has transmitted data using broadcasting function.
Figure 20B:
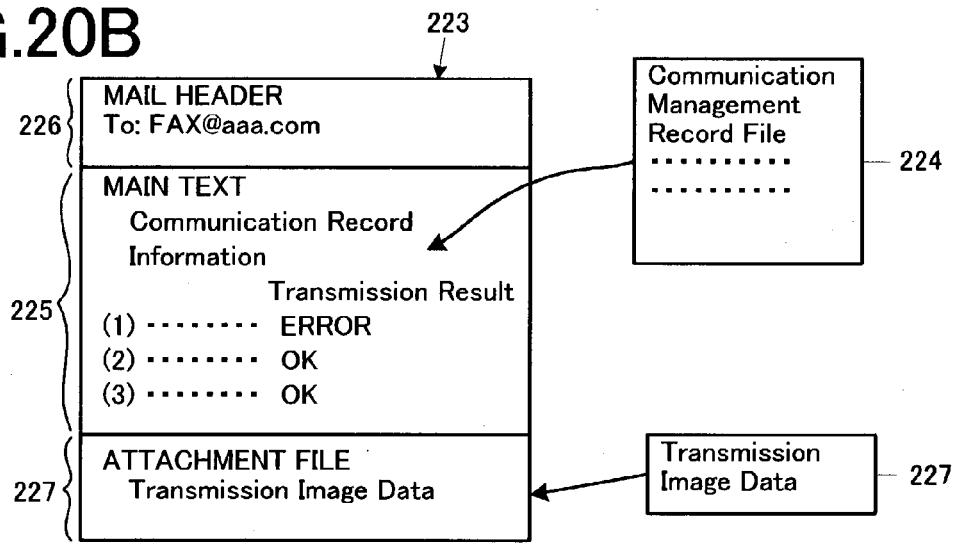
FIG. 20B is an explanation drawing of e-mail for archiving, which is created after the facsimile apparatus has transmitted data using broadcasting function.

Next, the operation of the facsimile apparatus 1 will be described when "(1) archive when data is transmitted successfully all of the broadcasting destination" is stored in S353. When an error does not occur while transmitting data to the all of the destinations in S354, or when data is transmitted successfully to all of the broadcasting destinations (S357), the facsimile apparatus 1 creates an e-mail for archiving 223, as illustrated in FIG. 20A. More specifically, the CPU 2 extracts a communication activity journal from a communication management record file 224 of all of the broadcasting destinations and describes it in a main text 225, attaches it to the main text 225 after converting one transmission image data 227 subject to the destination in S354 into the TIFF format capable of attaching an e-mail, and creates the e-mail for archiving 223 after describing the e-mail address for archiving in the "To:" field of an e-mail header 226 (S358). The facsimile apparatus 1 then transmits the e-mail 223 to an archive terminal apparatus 218 (S359), and updates the archive management record file 221 (FIG. 3) (S360). On the other hand, when determining that data cannot be transmitted to any broadcasting destination in S357, the data is not archived and a series of operation is terminated.

On the other hand, the CPU 2 determines to specify "(2) archive when data can be transmitted successfully to at least one destination" next when determining that "(1) archive when data is transmitted successfully to all of the broadcasting destination" is not specified in S356 (S361). When the item (2) is specified, the facsimile apparatus 1 creates the e-mail for archiving 223 as described above, transmits the e-mail to the archive terminal device 18, and updates the contents of the archive management record file 221 when data can be transmitted normally to more than one destination even if an error occurs while transmitting data to any destination (S12). However, when determining that data cannot be transmitted to all of the broadcasting destination in S362, the facsimile apparatus 1 does not archive data and terminates a series of operation. Additionally, as the information of "error" is described in the "communication result" field of the communication management record file 224 when data cannot be transmitted to any destination in the broadcasting destinations and "error" is also described in the "communication result" field of the communication activity journal of the main text 225 in the e-mail for archiving 223 through the communication management record file 224, an operator can know which transmission has failed by checking the information.

Figure 20C:
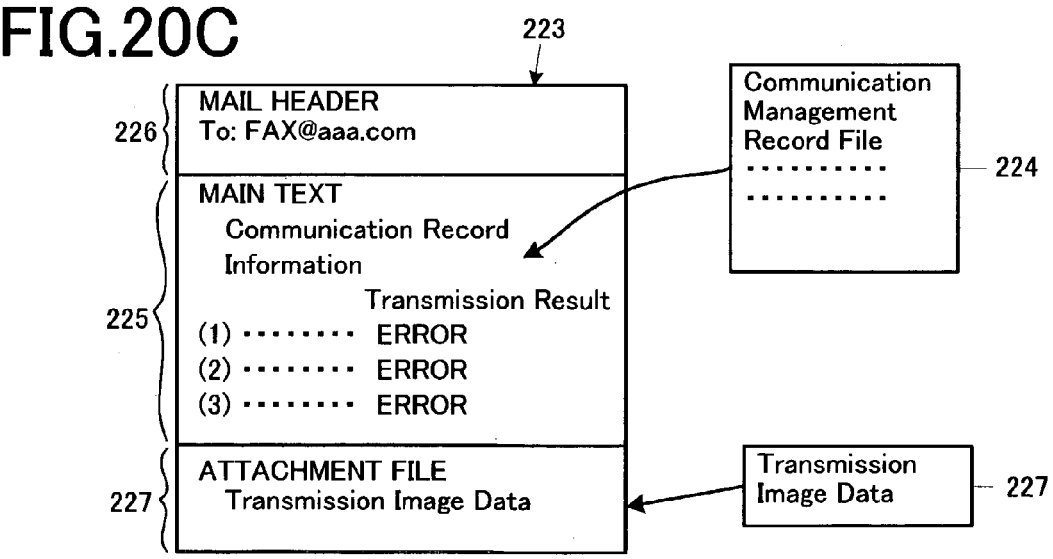
FIG. 20C is an explanation drawing of e-mail for archiving, which is created after the facsimile apparatus has transmitted data using broadcasting function.

On the other hand, when determining that "(2) archive when data can be transmitted successfully to at least one destination" is not chosen in S361, the CPU 2 chooses "(3) always archive" (S361). When an error occurs while transmitting to all of the destinations in S354, or even if transmission has failed to all of the broadcasting destinations, the facsimile apparatus 1 creates the e-mail for archiving 223, transmits it to the archive terminal deice 18, and updates the content of the archive management record file 221. Additionally, as "error" is described in all of the "communication result" fields of the communication activity journal in the main text 225 of the e-mail for archiving 223 when transmission has failed to all of the broadcasting destinations, as illustrated in FIG. 20C, an operator can know that transmission has failed to all of the broadcasting destinations by checking the information though transmission image data has been archived.

The facsimile apparatus 1 according to the embodiment, as described above, shows the archive method choice screen 222 in instructing to transmit data and requires an operator to choose the archiving method. Additionally, the facsimile apparatus can be composed so as to transmit using the broadcasting function in the same setting as far as changing the setting by setting any archiving method in advance. For example, a user who wants to manage only a document transmitted to all of the destinations by archiving chooses "(1) archive when data is transmitted successfully to all of the broadcasting destination". A user who wants to archive documents transmitted to at least one destination chooses "(2) archive when data can be transmitted successfully to at least one destination". A user who wants to record and manage all the transmission even if transmission has failed to all of the destinations chooses "(3) always archive". Thus, the facsimile apparatus 1 is capable of managing archive image data according to users' intentions.

Figure 21:
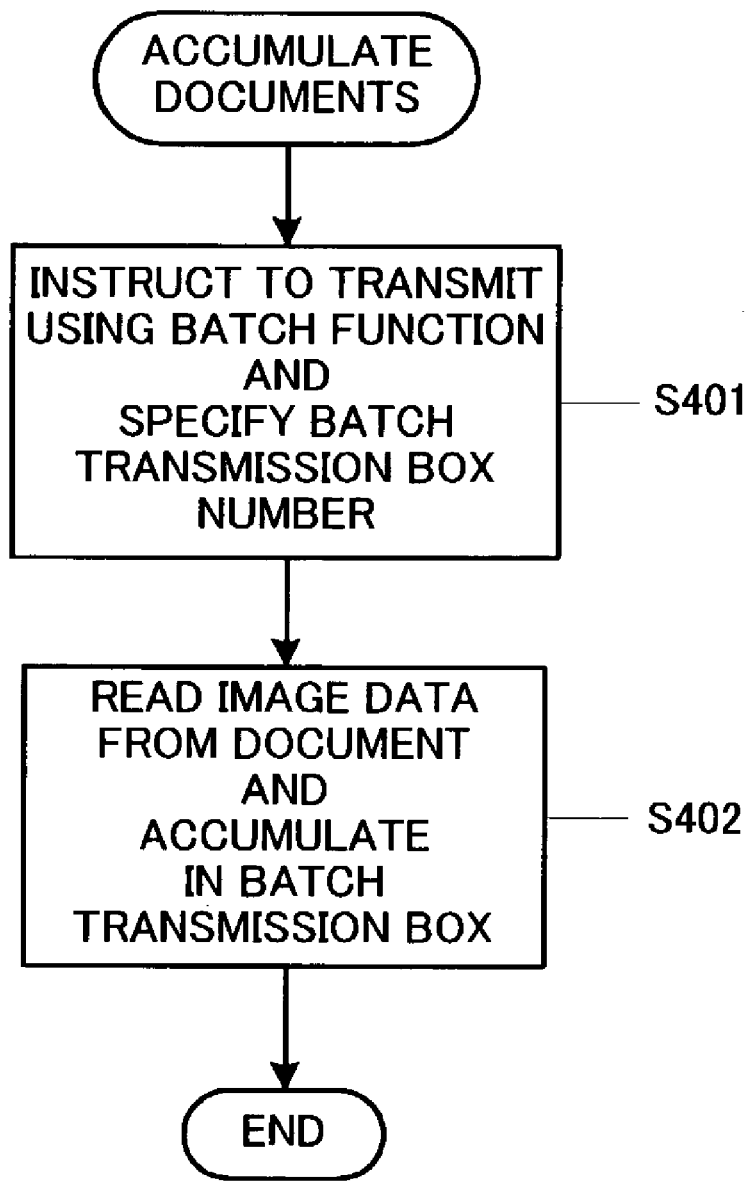
FIG. 21 is a flow chart showing operation of the facsimile apparatus when accumulating documents (image data) in a batch transmission box.
Figure 22:
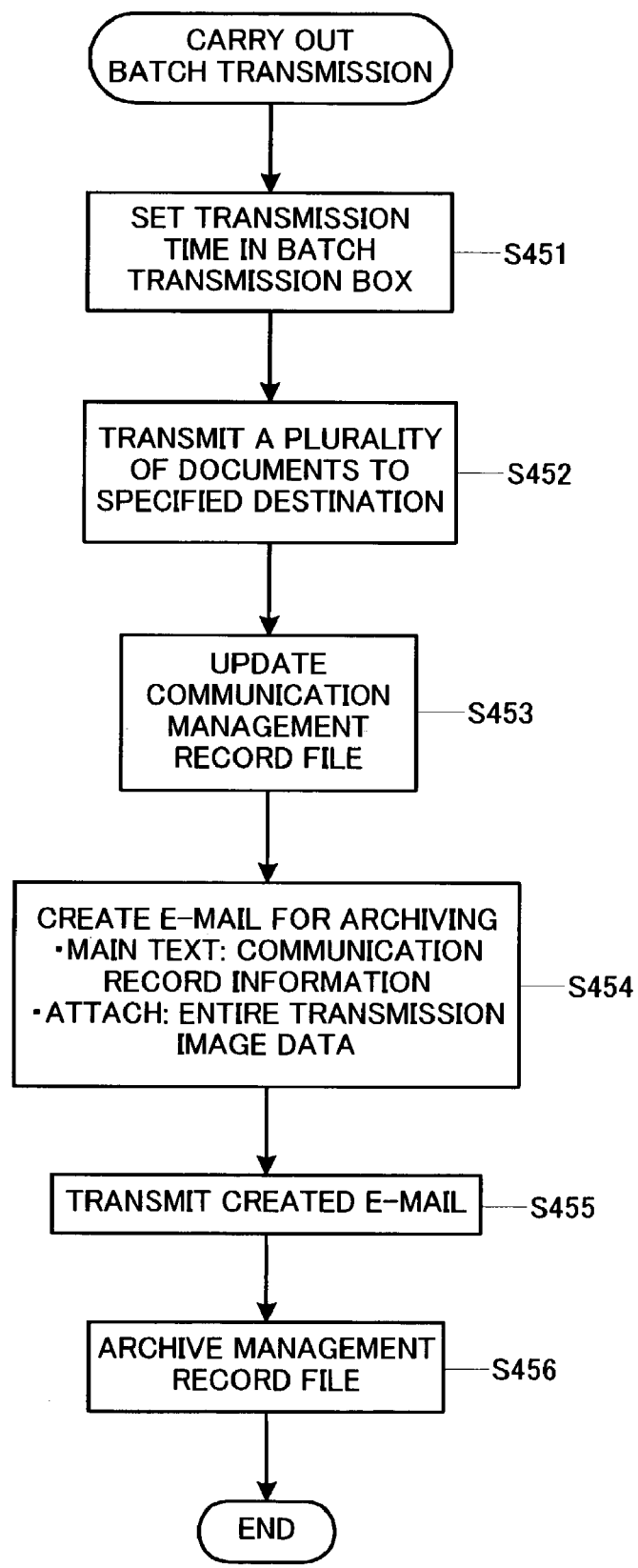
FIG. 22 is a flow chart showing operation of the facsimile apparatus in the forth embodiment when transmitting facsimile using batch function.

Next, operation in case that the facsimile apparatus transmits image data of documents using a batch function will be described with reference to flow charts of FIG. 21 and FIG. 22.

When an operator sets a document, instructs to transmit using the batch function and specifies a batch transmission box number in the operation unit 10 or the client PC 17, the facsimile apparatus 1 accepts the instruction (S401), and accumulates image data read from the document in the box number specified batch transmission box (S402).

Figure 23A:
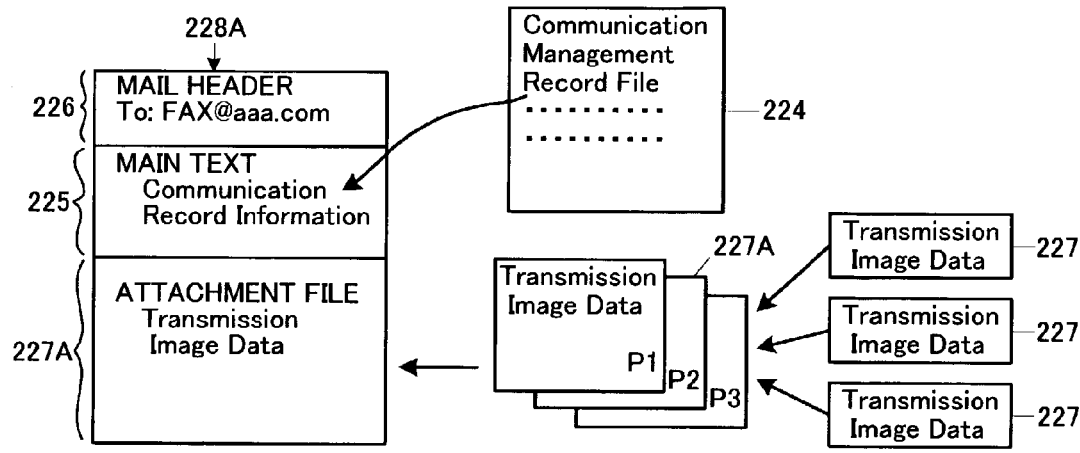
FIG. 23A is an explanation drawing of e-mail for archiving, which is created after the facsimile apparatus transmits data using batch function.

When a transmission time set in the box number has come, in the state that a plurality of documents is accumulated in the same box number after repeating the above operation (S451), the facsimile apparatus 1 transmits a plurality of documents to a set destination sequentially (S452), updates the communication management record file after the accumulated documents are all transmitted (S453), and creates an e-mail for archiving 228A as illustrated in FIG. 23A. More specifically, the CPU 2 extracts a communication activity journal of all the documents from the communication management record file 224, and describes it in the main text 225. The CPU 2 then attaches one file such as a TIFF file 227A, capable of having a plurality of pages made from all of the document (image data) 227 transmitted in S452, in the main text 225, and creates the e-mail for archiving 228A by describing an e-mail address for archiving in the "To:" field of the e-mail deader 226 (S454). The facsimile apparatus 1 transmits the e-mail 228A to the archive terminal device 18 (S455), and updates the archive management record file 221 (FIG. 17) (S456).

Figure 23B:
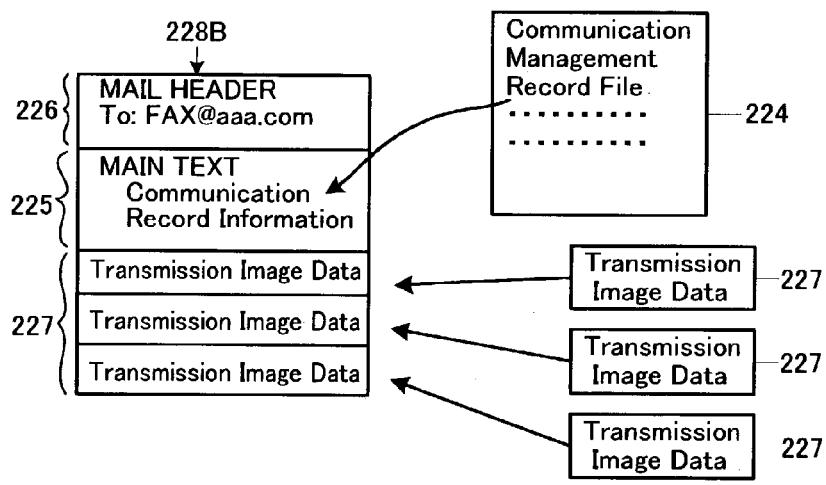
FIG. 23B is an explanation drawing of e-mail for archiving, which is created after the facsimile apparatus transmits data using batch function.

Additionally, the CPU 2 may create an e-mail for archiving 228B instead of the e-mail for archiving 228A, in which a plurality of transmission image data 227 is attached in every image data, or a plurality of image data is attached in the main text 225 as illustrated in FIG. 23B, without attaching a plurality of transmission image data 227 in the main text 225 as one file as described above. In this case, as a plurality of image data 227 is made from separate files, only a document can be picked up for printing, delivering, and copying to a media easily compared with the above case. Thus, the facsimile apparatus enhances users' convenience.

Figure 23C:
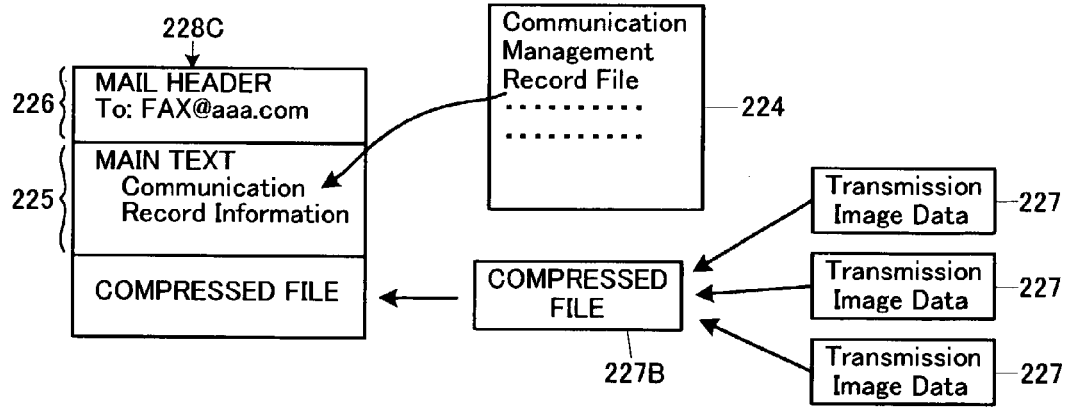
FIG. 23C is an explanation drawing of e-mail for archiving, which is created after the facsimile apparatus transmits data using batch function.

Moreover, as illustrated in FIG. 23C, the CPU 2 may create an e-mail for archiving 228C instead of the e-mail for archiving 228B by attaching a plurality of transmission image data 227 is attached in the main text 225 as one compressed file 227B made by compressing a plurality of image data 227 in "LZH" format. Consequently, a memory resource of the archive terminal device can be prevented from being wasted, and image data of a plurality of documents according to batch transmission can be managed in one image file.

What is claimed is:

1. A facsimile apparatus, comprising:
   an e-mail creation unit that creates an e-mail including image data transmitted or received by facsimile or via an Internet;
   a message description unit that describes a message in a predetermined area in an e-mail to be archived;
   a message specification unit that specifies the content of a message based on a communication type of the transmitted or received image data; and
   an archive unit that transmits e-mails to be archived to an e-mail address for archiving based on the content of a message from the message specification unit.

2. The facsimile apparatus as in claim 1, wherein communication types include facsimile transmission, facsimile reception, Internet facsimile transmission, or Internet facsimile reception.

3. A facsimile apparatus, comprising:
an e-mail creation unit that creates e-mail attached image data transmitted or received by facsimile or via an Internet;
an archive unit that transmits e-mails created in the e-mail creation unit to a predetermined e-mail address for archiving; and
a control unit that prevents transmitted or received image data from being archived when the image data is transmitted or received using a secured function.

4. The facsimile apparatus as in claim 3, wherein the archive unit transmits e-mails to an e-mail address for archiving, the e-mail of which is created in a unit that describes a communication activity journal on transmitted of received image data in a main text of the e-mail and creates the e-mail without attaching image data.

5. The facsimile apparatus as in claim 4, wherein a specification unit, which instructs to create an e-mail without attaching transmitted or received image data and to transmit the e-mail, is provided at every destination or destination specification information included in transmitted or received image data, and a control unit controlling the creation of an e-mail without attaching the image data and transmitting the e-mail based on an instruction from the specification unit.

6. A facsimile apparatus, comprising:
a transmission unit that transmits essentially the same image data to broadcasting destinations by facsimile or via an Internet;
an e-mail creation unit that creates an e-mail including one of the image data transmitted by the transmission unit; and
an archive unit that transmits the e-mail created in the e-mail creation unit to an e-mail address for archiving, wherein data is not archived when the transmission unit fails to transmit the data to all of the broadcasting destinations.

7. The facsimile apparatus as in claim 6, wherein the e-mail creation unit describes in the created email a communication activity journal including each of the broadcasting destinations to which the image data was transmitted.

* * * * *